United States Patent [19]

Funada et al.

[11] Patent Number: 5,555,107

[45] Date of Patent: Sep. 10, 1996

[54] IMAGE PROCESSING APPARATUS FOR JUDGING A COLOR USING SPATIAL FREQUENCY CORRECTED COLOR COMPONENT SIGNALS

[75] Inventors: Masahiro Funada; Yoichi Takaragi, both of Yokohama; Shinobu Arimoto, Tokyo; Michio Kawase, Yokohama, all of Japan

[73] Assignee: Canon Kabushiki Kaisha, Tokyo, Japan

[21] Appl. No.: 219,744

[22] Filed: Mar. 29, 1994

Related U.S. Application Data

[63] Continuation of Ser. No. 556,370, Jul. 24, 1990, abandoned.

[30] Foreign Application Priority Data

Jul. 25, 1989 [JP] Japan ................................ 1-193098
Jul. 27, 1989 [JP] Japan ................................ 1-196049

[51] Int. Cl.[6] ............................................................. H04N 1/60
[52] U.S. Cl. ............................ 358/518; 358/528; 382/299
[58] Field of Search ................................. 382/17, 162, 167, 382/299; 348/624, 630, 631, 710, 711; 358/529, 528, 518

[56] References Cited

U.S. PATENT DOCUMENTS

| | | | |
|---|---|---|---|
| 4,320,414 | 3/1982 | Miyaji et al. | 358/51 |
| 4,672,430 | 6/1987 | Asaida | 358/50 |
| 4,679,074 | 7/1987 | Sugiura et al. | 358/529 |
| 4,736,251 | 8/1988 | Sasaoka | 358/75 |
| 4,774,566 | 9/1988 | Kawamura et al. | 358/75 |
| 4,797,945 | 1/1989 | Suzuki et al. | 358/56 |
| 4,814,898 | 3/1989 | Arimoto et al. | 358/260 |
| 4,903,145 | 2/1990 | Funada | 358/462 |
| 4,953,014 | 8/1990 | Takaragi | 358/77 |
| 4,974,072 | 11/1990 | Hasegawa | 358/80 |
| 4,985,760 | 1/1991 | Maeshima et al. | 358/80 |
| 4,999,717 | 3/1991 | Nagashima | 358/448 |

FOREIGN PATENT DOCUMENTS

| | | | |
|---|---|---|---|
| 0317268 | 5/1989 | European Pat. Off. | H04N 1/40 |
| 3629195 | 7/1987 | Germany | H04N 1/46 |
| 3839299 | 6/1989 | Germany | H04N 1/40 |
| 56-152370 | 11/1981 | Japan | H04N 1/04 |
| 61-097056 | 5/1986 | Japan | H04N 1/04 |
| 61-109966 | 5/1986 | Japan | H04N 1/46 |

*Primary Examiner*—Leo Boudreau
*Assistant Examiner*—Andrew W. Johns
*Attorney, Agent, or Firm*—Fitzpatrick, Cella, Harper & Scinto

[57] ABSTRACT

An image processing apparatus includes an input unit for inputting a plurality of color component signals, and a processing unit for executing processing for some color component signals of the plurality of color component signals, which processing is different from that for the remaining color component signals, in accordance with spatial frequency gain characteristics of the plurality of color component signals input by the input unit.

9 Claims, 30 Drawing Sheets

FIG. 7
|a|b|c|
|---|---|---|
|d|e|f|
|g|h|i|
CORRECTION EXAMPLE 1
| 0 | 0 | 1 |
|---|---|---|
| 0 | 0 | 1 |
| 0 | 0 | 1 |
→
CORRECTION EXAMPLE 2
| 0 | 1 | 0 |
|---|---|---|
| 0 | 0 | 0 |
| 0 | 0 | 0 |
→
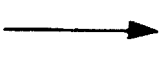
PRE-CORRECTION SIGNAL VALUE    POST-CORRECTION SIGNAL VALUE

IMAGE PROCESSING APPARATUS FOR JUDGING A COLOR USING SPATIAL FREQUENCY CORRECTED COLOR COMPONENT SIGNALS

This application is a continuation of application Ser. No. 07/556,370 filed Jul. 24, 1990, now abandoned.

BACKGROUND OF THE INVENTION

1. Field of the Invention

The present invention relates to an image processing apparatus for processing a plurality of color component signals and generating reproduced color image signals.

2. Related Background Art

In a conventional color printer, for example, a technique for preventing degradation of image quality caused by misregistration of color inks when a plurality of primary color inks are overlaid to record an image is known. According to this technique, levels of a plurality of primary color signals are compared, and when they indicate achromatic color levels, only a black ink is colored on a reproduction surface, thereby preventing degradation of image quality.

In particular, in a reading means (e.g., a 3-line CCD sensor) in which a plurality of parallel line sensors are arranged at equal intervals, and an image is focused on these sensors to read an image so as to generate a plurality of color component signals, as shown in FIGS. 12 and 15, the above-mentioned misregistration problem cannot be ignored. Therefore technique for accurately discriminating chromatic/achromatic levels is proposed in, e.g., U.S. patent application Ser. No. 416,587.

This prior art, however, does not take into consideration a difference between spatial frequency gain characteristics inherent to sensors for generating R (red), G (green), and B (blue) color component signals upon discrimination of chromatic and achromatic signals.

For this reason, when the color components are subjected to the same signal processing, a chromatic/achromatic judgment error caused by degradation of an achromatic level cannot be prevented due to a difference between spatial frequency gain characteristics of the R, G, and B sensors.

U.S. patent application Ser. No. 416,587 also proposes a method of correcting offsets of reading positions caused by intervals between adjacent line sensors. According to this method, output signals of a specific pixel group are interpolated to align image signals among pixel groups.

According to the prior art, however, spatial frequency sensitivity characteristics are impaired due to interpolation calculations and characteristics of the apparatus, thus often causing a change in color at a change point (e.g., an edge portion) of an image. For this reason, color misregistration particularly appears at an image edge portion, and image quality of this portion is considerably degraded.

The color misregistration is especially conspicuous in the above-mentioned 3-line CCD sensor.

SUMMARY OF THE INVENTION

The present invention has been made in consideration of the conventional drawbacks, and has as its object to provide an image processing apparatus which takes into consideration spatial frequency characteristics of color component signals.

In order to achieve the above object, an image processing apparatus of the present invention comprises an input means for inputting a plurality of color component signals, and a processing means for executing different processing for some of the plurality of color component signals from that for the remaining color component signals according to spatial frequency gain characteristics of the plurality of color component signals input by the input means.

It is another object of the present invention to provide an image processing apparatus which can accurately discriminate a chromatic/achromatic level of an image.

In order to achieve the above object, an image processing apparatus of the present invention comprises an input means for inputting first and second color component signals, a smoothing means for smoothing the first input color component signal, and a discrimination means for discriminating a chromatic/achromatic level of an input image indicated by the first and second input color component signals using the second input color component signal having lower spatial frequency gain characteristics than those of the first color component signal, and the first color component signal smoothed by the smoothing means.

In the above arrangement, the discrimination means discriminates the chromatic/achromatic level of the input image indicated by the first and second color component signals using the first input color component signal smoothed by the smoothing means and the second input color component signal having lower spatial frequency characteristics than those of the first input color component signal.

It is still another object of the present invention to provide an image processing apparatus which is free from color misregistration, and has good color reproducibility.

It is still another object of the present invention to provide an image processing apparatus which takes into consideration spatial frequency characteristics of color component signals.

In order to achieve the above objects, an image processing apparatus according to the present invention comprises an image signal generation means for generating a plurality of image signals on the basis of different spectral characteristics, and a smoothing processing means for executing smoothing processing of at least one of the plurality of image signals excluding a signal having lowest spatial frequency gain characteristics in a specific direction.

In the arrangement of the present invention, the smoothing processing means executes smoothing processing of at least one of the plurality of image signals as outputs from the image signal generation means excluding the signal having lowest spatial frequency gain characteristics in the specific direction.

An image signal processing apparatus according to the present invention comprises a means for generating a plurality of image signals on the basis of different spectral characteristics, and an interpolation calculation means for executing an interpolation calculation of at least one of the plurality of image signals excluding a signal having lowest spatial frequency gain characteristics in a specific direction.

In the arrangement of the present invention, the interpolation calculation means executes an interpolation calculation of at least one of the plurality of image signals as outputs from the image signal generation means excluding the signal having lowest spatial frequency gain characteristics in the specific direction.

It is still another object of the present invention to provide an image processing apparatus suitable for high-speed processing.

It is still another object of the present invention to provide an image processing apparatus with a simple arrangement.

The above and other objects of the present invention will become apparent from the following descriptions of the embodiments, accompanying drawings, and appended claims.

BRIEF DESCRIPTION OF THE DRAWINGS

FIG. 7 shows an example of OR signal processing according to the first embodiment of the present invention;

DETAILED DESCRIPTION OF THE PREFERRED EMBODIMENTS

Preferred embodiments of the present invention will be described hereinafter with reference to the accompanying drawings.

First Embodiment

Figure 10:
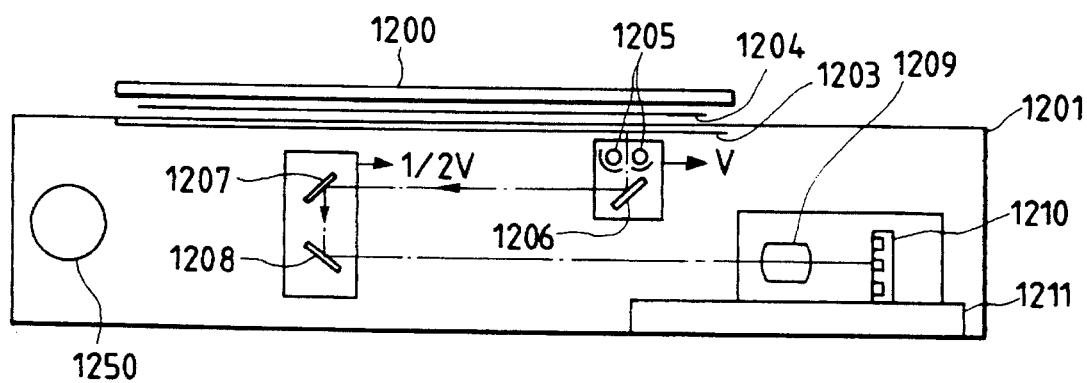
FIG. 10 is a sectional view showing a structure of an image scanner unit.

FIG. 10 is a sectional view of the first embodiment of an image processing apparatus according to the present invention. The apparatus shown in FIG. 10 includes an image scanner unit 1201 for reading an original image, and performing digital signal processing.

The image scanner unit 1201 includes a mirror surface pressing plate 1200. An original 1204 on an original glass (to be referred to as a platen hereinafter) 1203 is illuminated with light emitted from a lamp 1205. Light reflected by the original 1204 is guided by mirrors 1206, 1207, and 1208, and forms an image on a 3-line sensor (to be referred to as a CCD hereinafter) 1210. As a result, red (R), green (G), and blue (B) components of full color information are then supplied to a chromaticity judgment section 1211. The lamp 1205 and the mirror 1206 mechanically scan the entire original surface in a direction perpendicular to an electrical scan direction of the line sensor at a speed v, and the mirrors 1207 and 1208 mechanically scan the entire original surface in the same manner as the above components at a speed ½ v.

A motor 1250 drives the lamp 1205.mirror 1206 portion and the mirrors 1207,1208 portion in the sub scan direction. The apparatus shown in FIG. 10 also includes an image processing unit 1211 (to be described later).

An image can be read at a desired magnification factor by executing predetermined electrical signal processing (thinning, interpolation, and the like of data) in the main scan direction, and by varying a rotational speed of the motor 1250 in the sub scan direction.

Figure 11:
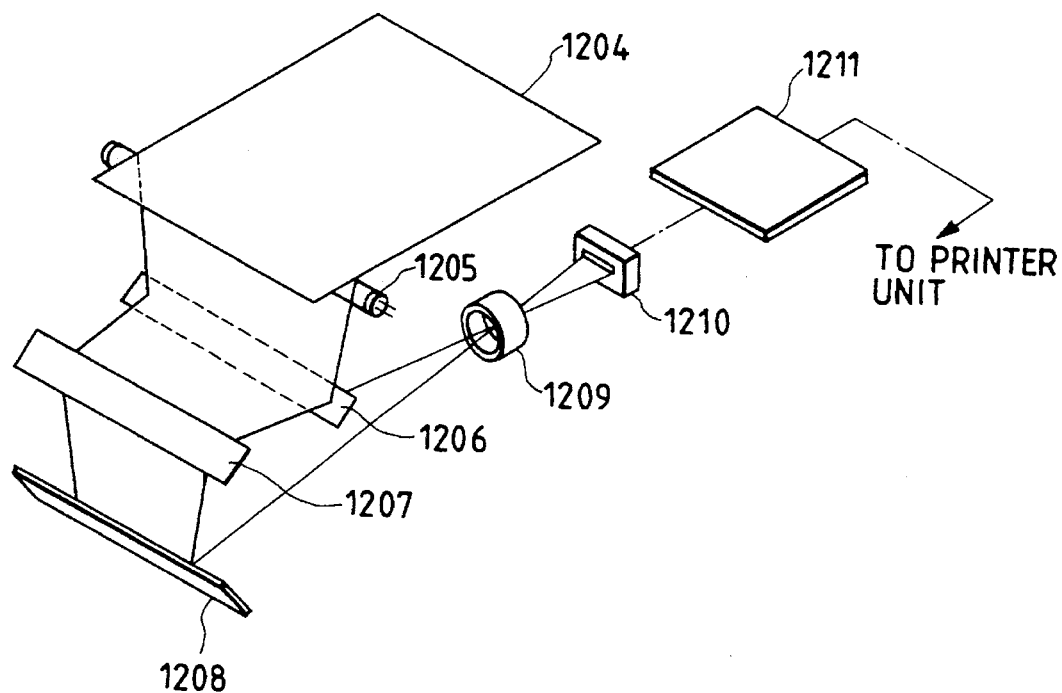
FIG. 11 is a perspective view for explaining an image formation state in the image scanner unit.

FIG. 11 is a view for explaining an image formation state of an original image on the sensor 1210 in the image scanner unit described above. Since reference numerals in FIG. 11 are the same as those in FIG. 10, a description thereof will be omitted.

Figure 12:
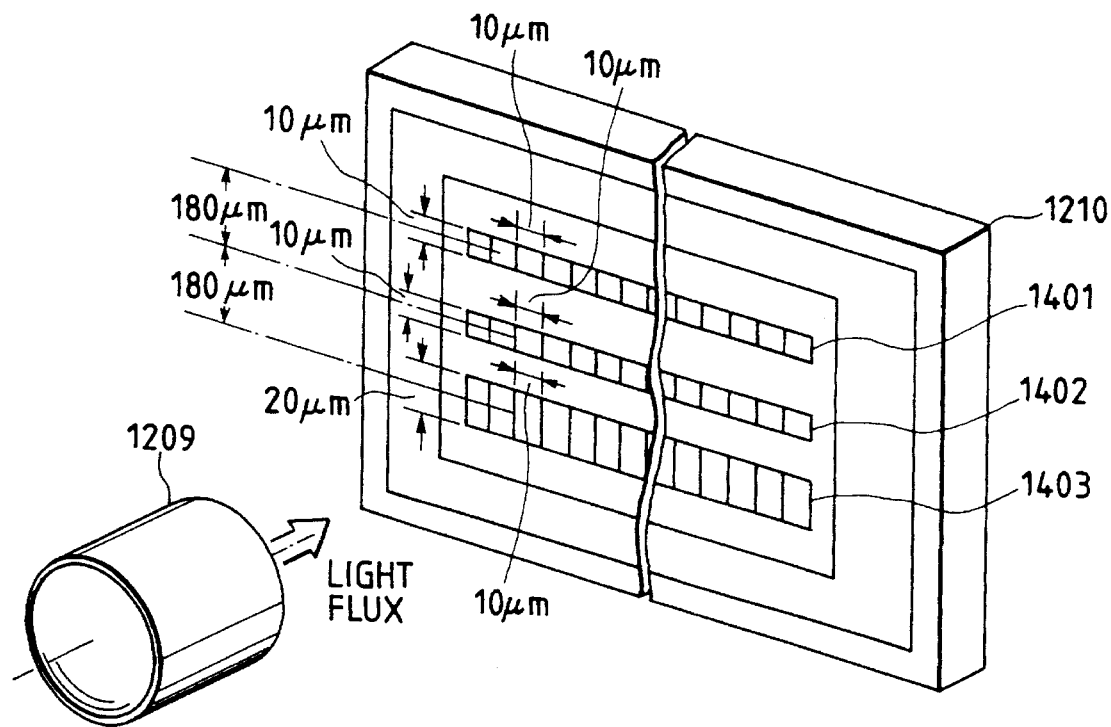
FIG. 12 is a perspective view showing a 3-line CCD sensor.

FIG. 12 shows an outer appearance of the 3-line CCD 1210. A line sensor 1401 for a red component (R) includes a plurality of light-receiving elements covered with a filter for allowing only a red light component to pass therethrough. Similarly, a line sensor 1402 for a green component (G) includes a plurality of light-receiving elements whose surfaces are covered with a filter for allowing only a green light component to pass therethrough, and a line sensor 1403 for a blue component (B) includes a plurality of light-receiving elements whose surfaces are covered with a filter for allowing only a blue light component to pass therethrough.

These line sensors are arranged parallel and adjacent to each other at a pitch of 180 μm. The B line sensor comprises a 20 μm×10 μm light-receiving element array, and the R and G line sensors comprise 10 μm×10 μm light-receiving element arrays, respectively. The B line sensor and the R and G line sensors have different light-receiving areas of the light-receiving elements for the following reason. That is, in general, in a blue component transmission filter, a transmittance of blue light tends to be lower than that of red/green light in a red/green component transmission filter. Therefore, in order to improve an S/N (signal/noise) ratio of a signal, the light-receiving area of only the B light sensor is increased to match its level with those of R and G signals.

Figure 13:
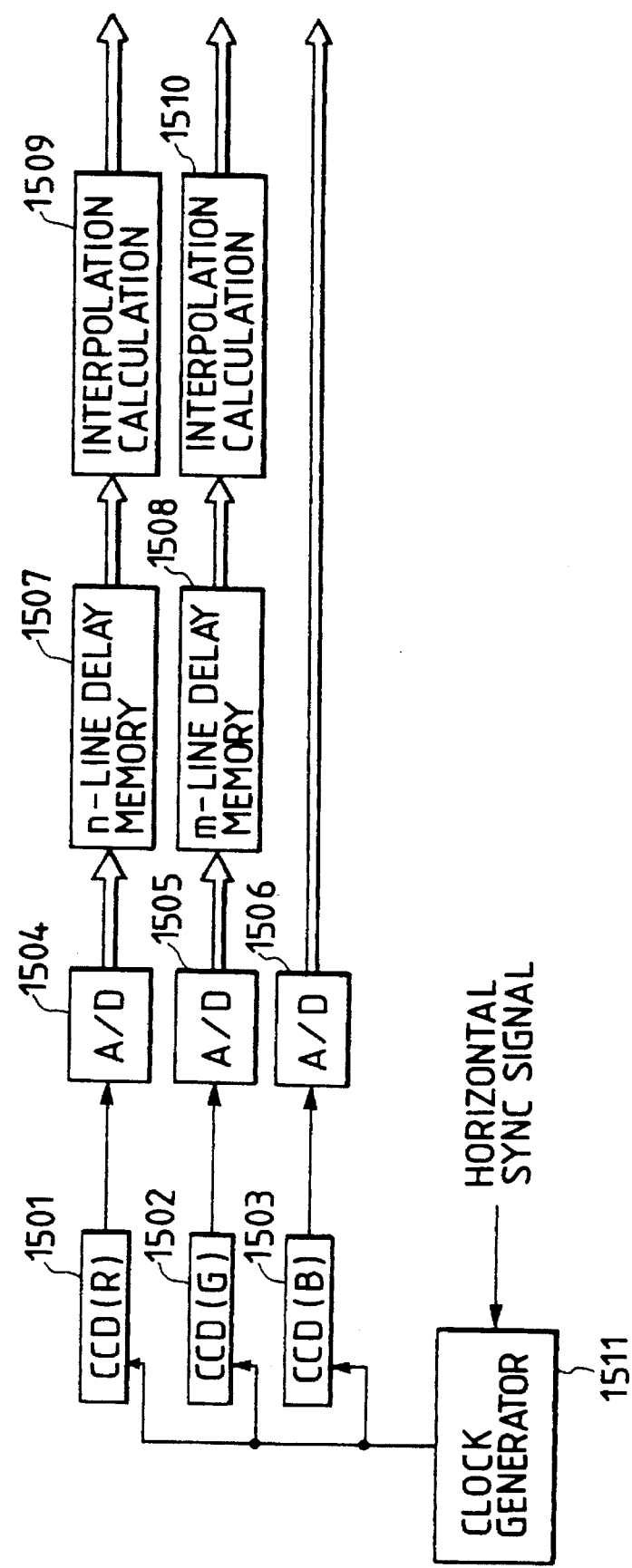
FIG. 13 is a block diagram of the image scanner unit.

FIG. 13 is a block diagram of the image sensor unit 1210 of the image processing apparatus of this embodiment. The image sensor unit 1210 includes an R (red) color sensor 1501, a G (green) color sensor 1502, a B (blue) color sensor 1503, A/D (analog-to-digital) converters 1504 to 1506, an R sensor signal delay memory 1507, a G sensor signal delay memory 1508, an R sensor signal interpolation calculation section (interpolator) 1509, and a G sensor signal interpolation calculation section (interpolator) 1510. The unit 1210 also includes a clock generator 1511 for driving the sensors 1501, 1502, and 1503 with the same clock. The clock generator generates a pixel clock (CCD transfer clock) in synchronism with a horizontal sync signal sent from a printer or a microprocessor 1611 shown in FIG. 14.

Figure 14:
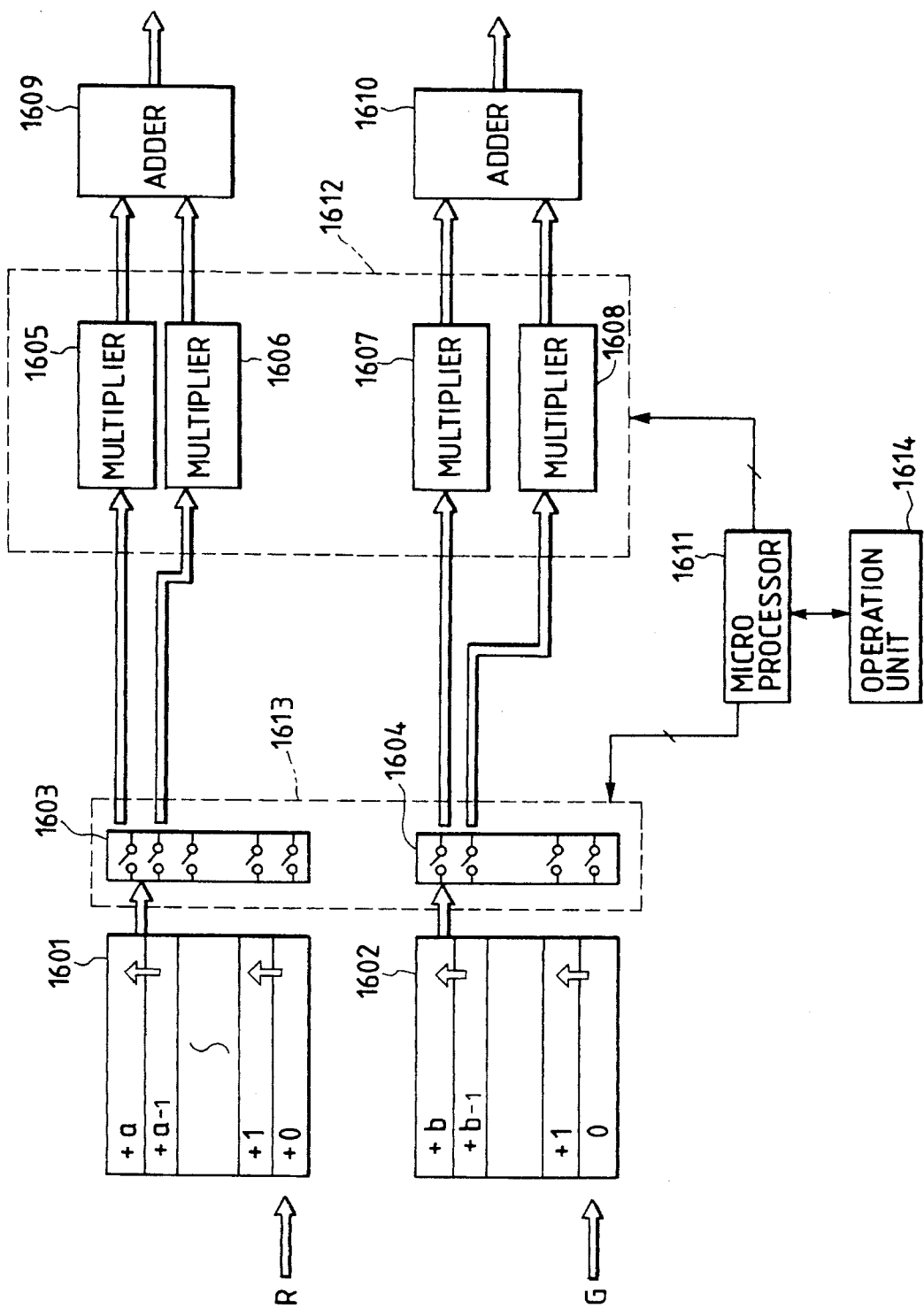
FIG. 14 is a circuit diagram showing delay memories and interpolators.

FIG. 14 is a diagram of the delay memories 1507 and 1508 and the interpolators 1509 and 1510 shown in FIG. 13.

The circuit shown in FIG. 14 includes an R signal delay memory 1601 comprising a FIFO memory, a G signal delay memory 1602 comprising a FIFO memory, selectors 1603 and 1604 for selecting sensor line data of the FIFO memories to be sent to multipliers, multipliers 1605, 1606, 1607, and 1608, and adders 1609 and 1610. The circuit also includes an operation unit 1614 for inputting and displaying a magnification factor, and the like, and a microprocessor 1611 for controlling the multipliers 1605 to 1608 and the selectors 1603 and 1604 on the basis of magnification data from the operation unit 1614.

In this embodiment, an interval between the adjacent line sensors is 180 μm, and a sensor pixel width is 10 μm. The R and G signal delay memories 1601 and 1602 in FIG. 14 respectively comprise 36- and 18-line memories as memory sizes necessary in an equi-magnification read mode.

Chromatic/achromatic judgment in the image sensor unit 1211 of this embodiment will be described below.

Figure 8:
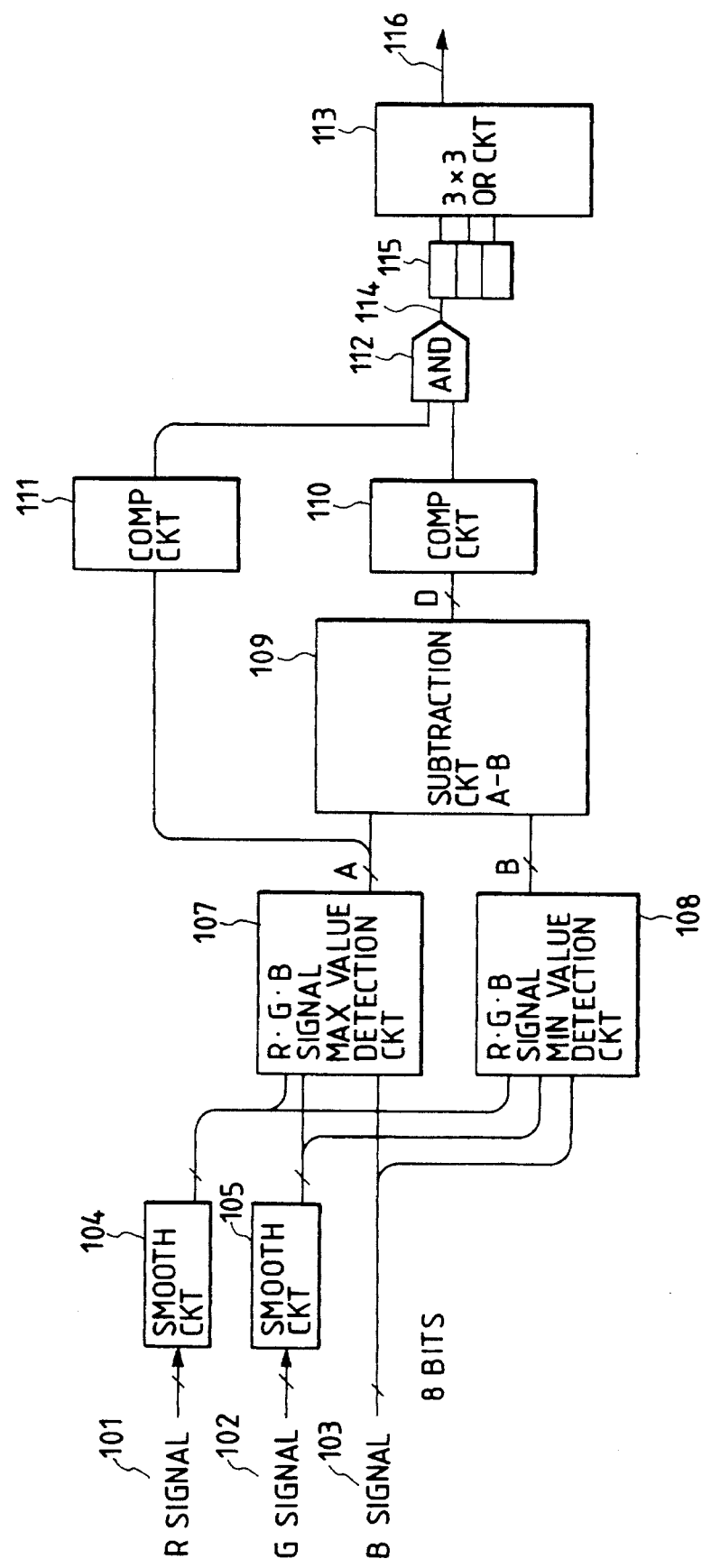
FIG. 8 is a block diagram showing a black area judgment circuit according to the first embodiment of the present invention.

FIG. 8 is a block diagram of a black area judgment circuit. In FIG. 8, input color signals 101, 102, and 103 are 8-bit digital signals corresponding to R (red), G (green), and B (blue), respectively. The circuit shown in FIG. 8 includes R and G color signal smooth circuits 104 and 105, an R.G.B signal MAX value detection circuit 107 for detecting a maximum value A (A=max(R,G,B)) of R, G, and B signals, and an R.G.B signal MIN value detection circuit 108 for detecting a minimum value B (B=min(R,G,B)) of R, G, and B signals.

The circuit also includes a subtraction circuit 109 for obtaining D=max(R,G,B)−min(R,G,B) using the values obtained by the detection circuits 107 and 108, and a comparison circuit 110 for comparing the value D calculated by the subtraction circuit 109 with a constant a and outputting a comparison result satisfying one of relations (1):

D<a: Output 1

D≧a: Output 0     (1)

Meanwhile, a comparison circuit 111 compares the value A (A=max(R,G,B)) with a constant b, and outputs a comparison result satisfying one of the relations (2):

A<b: Output 1

A≧b: Output 0     (2)

The circuit also includes an AND circuit 112 for logically ANDing the output signals from the circuits 110 and 111, and an OR circuit (or black area signal correction circuit) 113 for correcting a black area signal output from the AND circuit 112.

Figure 4:
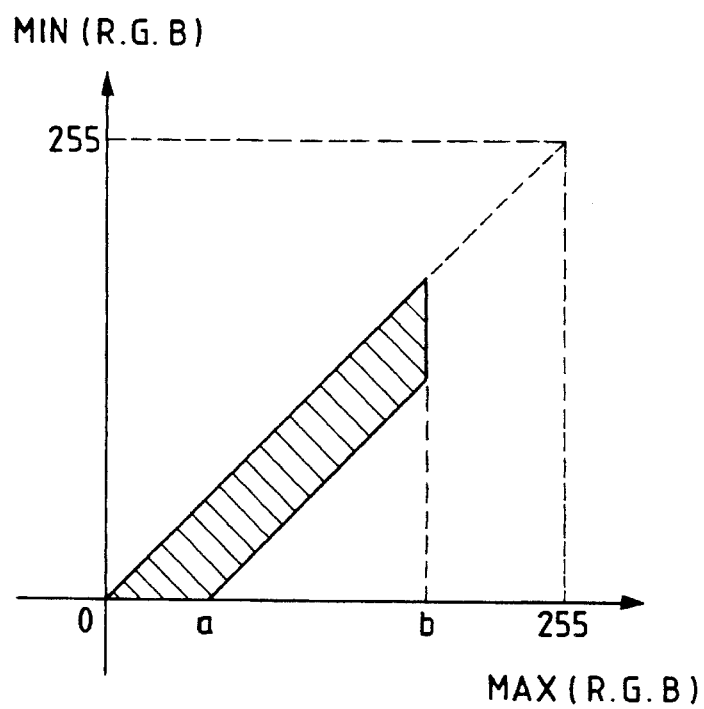
FIG. 4 is a graph for explaining a black area in a max(R,G,B)-min(R,G,B) space according to the first embodiment of the present invention.

In this embodiment, as the lightness becomes higher, an input color signal value becomes larger. Therefore, when D=max(R,G,B)−min(R,G,B) is smaller than the constant a and A=max(R,G,B) is smaller than a predetermined lightness corresponding to the constant b, that is, when an input color signal value is included in a hatched region shown in FIG. 4, the AND circuit 112 outputs "1" to the black area correction circuit 113. Otherwise, that is, when the input signal value is not included in the hatched region shown in FIG. 4, the AND circuit 112 outputs "0" to the correction circuit 113.

By appropriately determining the constants a and b, a black area of an input image can be discriminated from other chromatic color areas and bright original background color portions.

A judgment error may occur in a portion around the black area due to the influence of color misregistration of input color signals. The black area signal correction circuit 113 corrects the judgment error. Note that the circuit shown in FIG. 8 includes a line buffer 115. A black area signal 114 is obtained by reading and judging an original black character, and a judgment signal 116 is output from the correction circuit 113.

Figure 2:
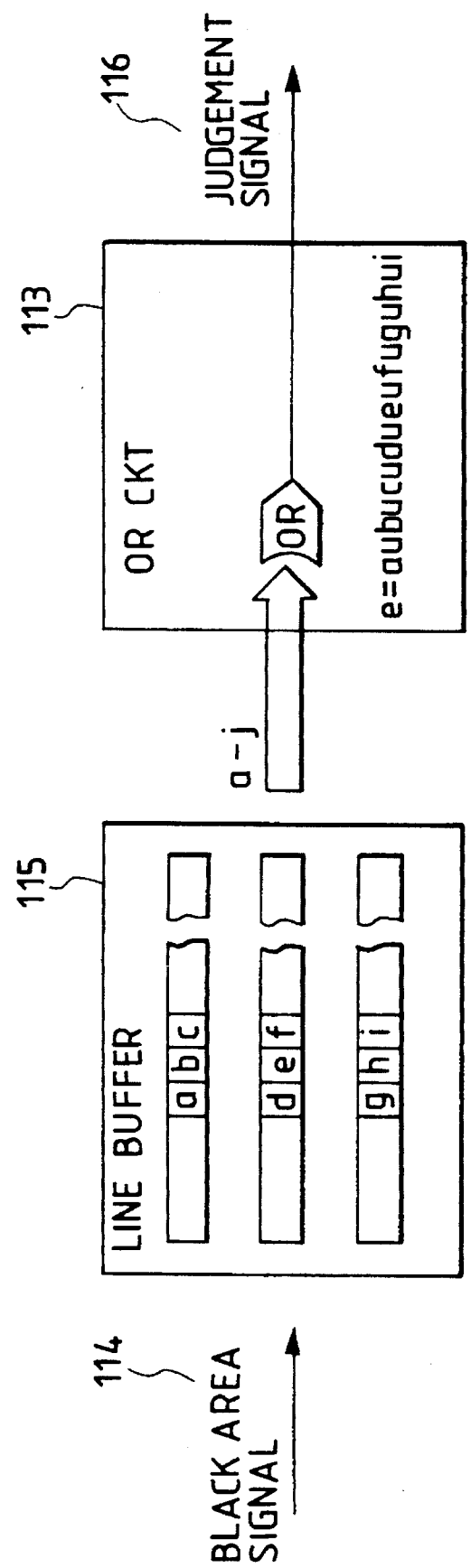
FIG. 2 is a block diagram of a black area correction circuit according to the first embodiment of the present invention.

FIG. 2 is a functional block diagram of the black area signal correction circuit 113. In FIG. 2, a line buffer 115 stores the black area signal 114 output from the AND circuit 112, and its one bit corresponds to one pixel. The OR circuit 113 corrects the black area signal 114 stored in the line buffer 115, and outputs the judgment signal 116. The OR circuit 113 logically ORs values of a pixel e to be corrected and its surrounding eight pixels (a, b, c, d, f, g, h, i). When at least one of the pixels a to i is "1", the OR circuit outputs "1"; when all the pixels a to i are "0", the circuit outputs "0". FIG. 7 shows a correction example by this correction circuit. In a correction example 1, of pixels a to i, pixels a, b, d, e, g, and h are "0", and pixels c, f, and i are "1". In this case, even if the pre-correction value of the pixel e to be corrected is "0", its post-correction value of the pixel e becomes "1". In a correction example 2, only a pixel b is "1", and other pixels are "0". In this case, even if the pre-correction value of the pixel e to be corrected is "0", its post-correction value of the pixel e becomes "1".

In this manner, since the chromatic/achromatic judgment signal 116 is generated using data of surrounding pixels, a chromatic/achromatic judgment error due to a position offset among color component signals caused by, e.g., a vibration of a motor can be prevented in the above-mentioned 3-line sensor.

Figure 6:
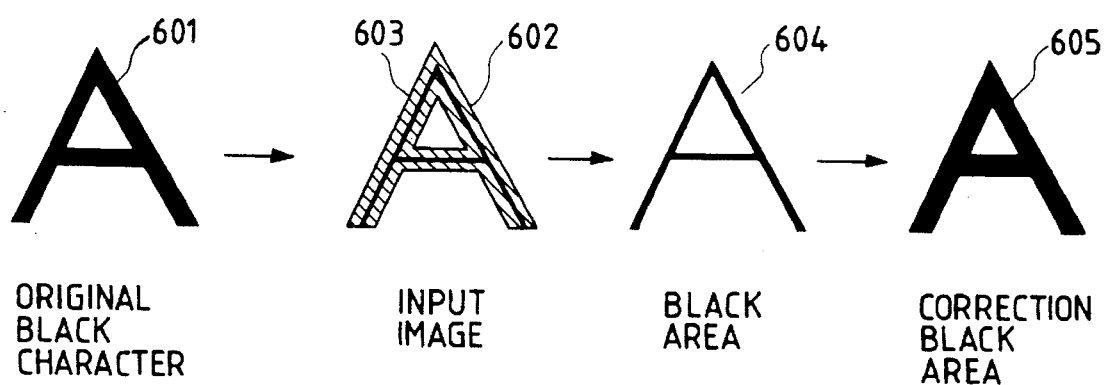
FIG. 6 is a view for explaining a process for reproducing a corrected black area from an original black character according the first embodiment of the present invention.

FIG. 6 is a view for explaining a process for reproducing a corrected black area from an original black character. FIG. 6 illustrates an original black character, an input image 602, a black area 604 before correction, and a corrected black area 605. As shown in FIG. 6, the black area signal 114 obtained by reading the original black character 601 is judged to be thinner than the original black character, as indicated by the black area 604, due to a color misregistration error 603 of input color signals, which error occurs when a portion surrounding the original black character is read. The correction circuit 113 corrects the black area signal 114, and outputs the judgment signal 116, thereby reproducing the corrected black area 605 subjected to fattening processing.

Figure 1:
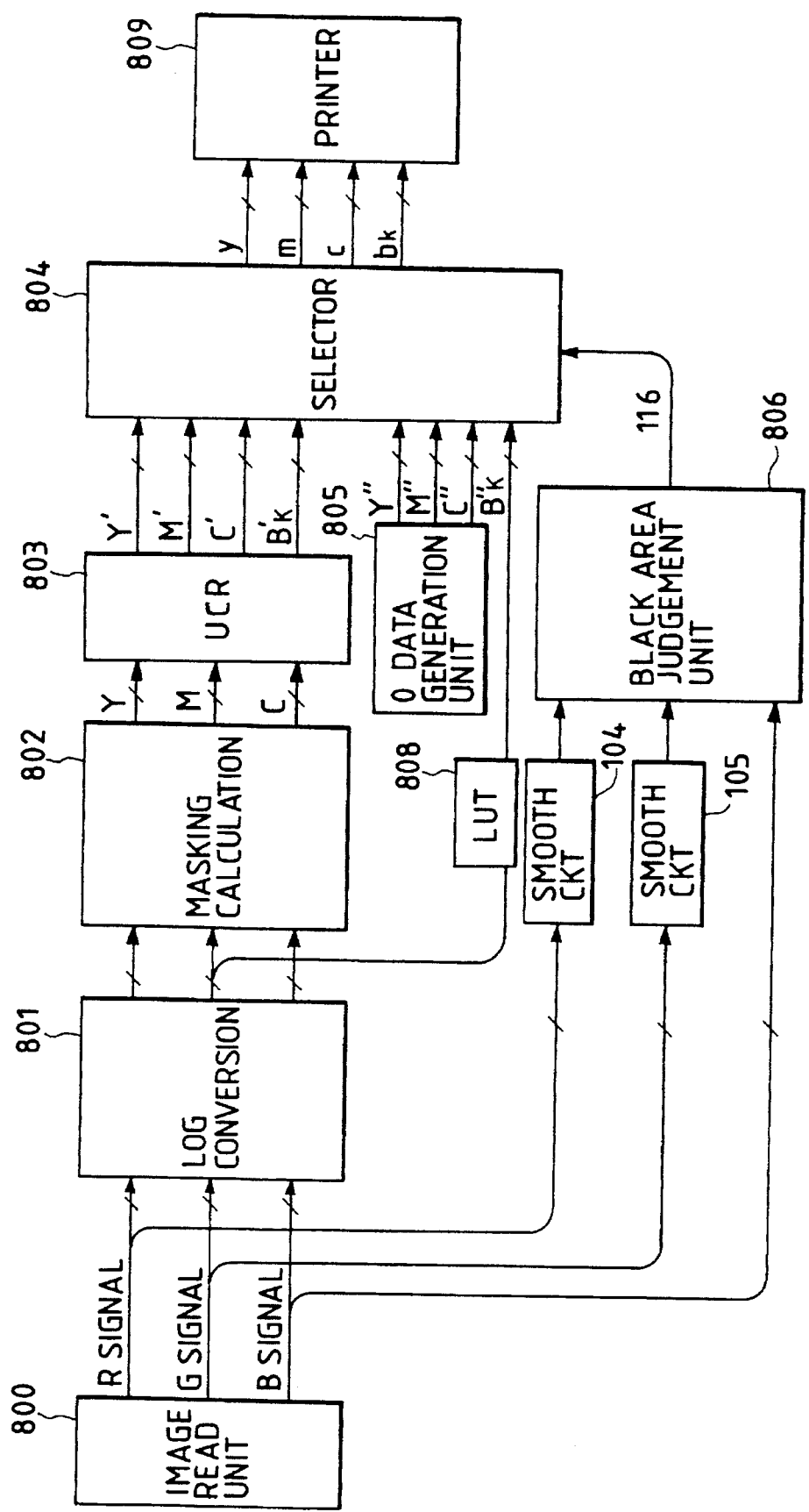
FIG. 1 is a block diagram of color signal processing according to the first embodiment of the present invention.
Figure 3:
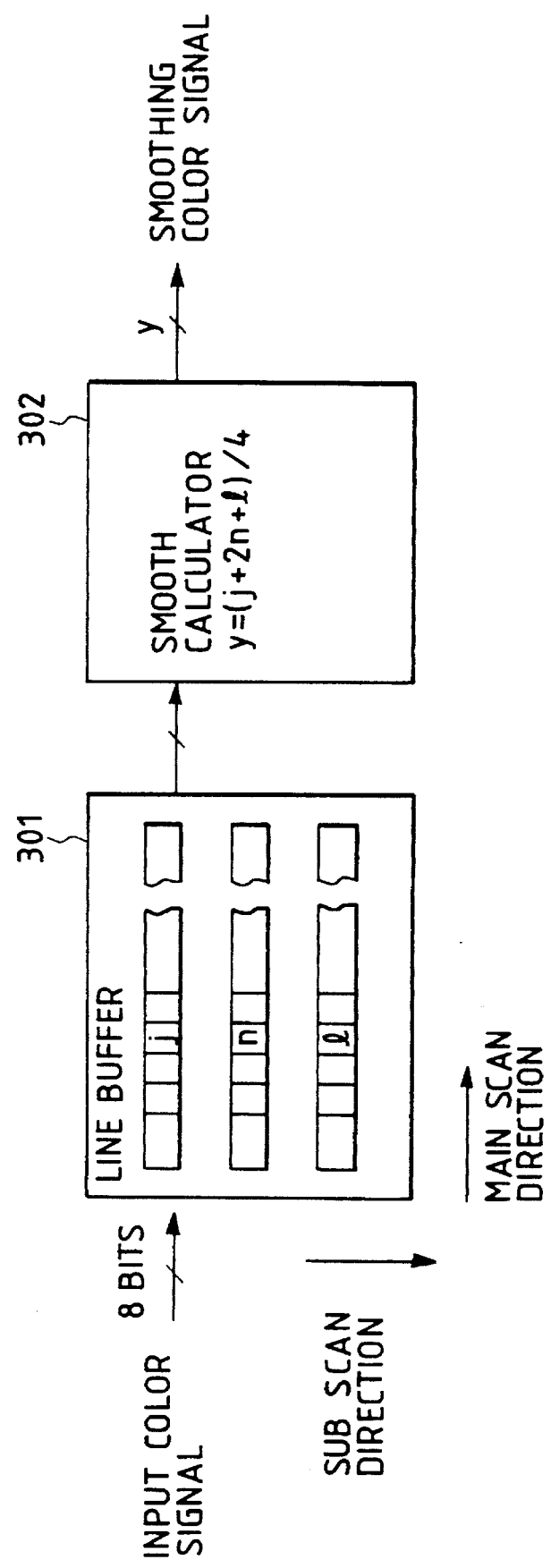
FIG. 3 is a functional block diagram of a smoothing circuit according to the first embodiment of the present invention.

FIG. 3 is a block diagram showing functions of the smoothing circuits 104 and 105 shown in FIGS. 1 and 8. In FIG. 3, a line buffer 301 stores input color signals, and its 8 bits correspond to one pixel. A smoothing calculator 302 outputs the input color signals stored in the line buffer 301 as smoothing color signals. The calculator 302 calculates a weighting mean expressed by the following equation using three adjacent pixels (j, n, and l) in the sub scan direction of a pixel n to be smoothed, thereby obtaining the smoothing color signals.

$$y=(j+2n+l)/4$$

Figure 5A:
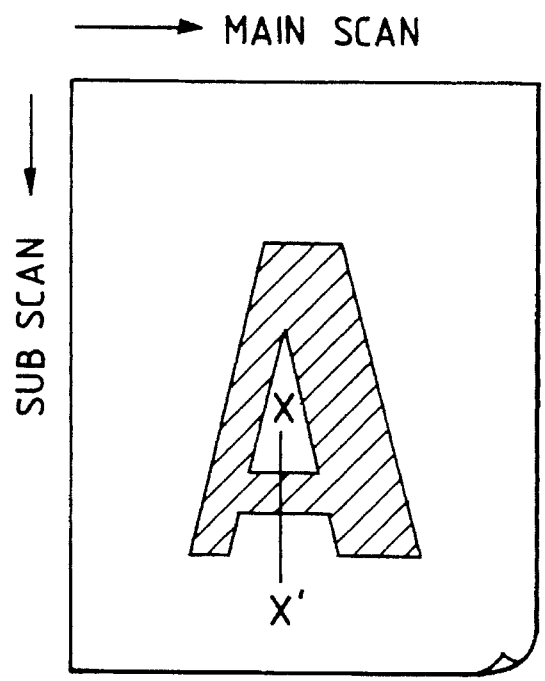
FIGS. 5A to 5C are views showing effects of the smoothing circuit.
Figure 5B:
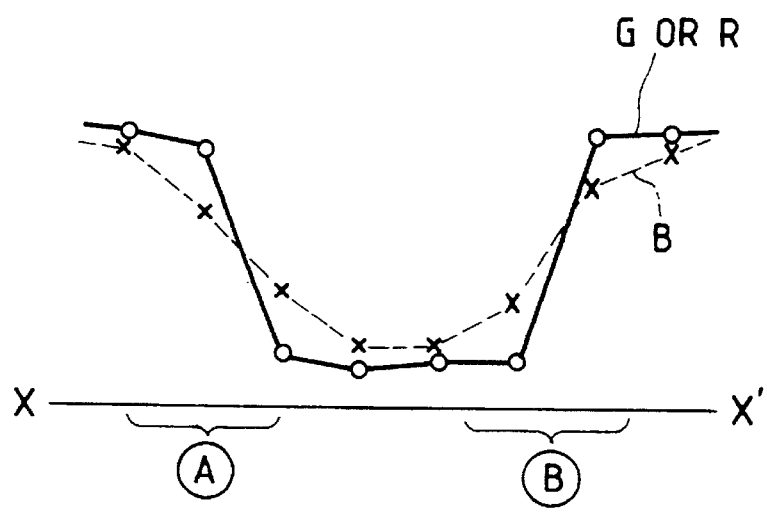
Figure 5C:
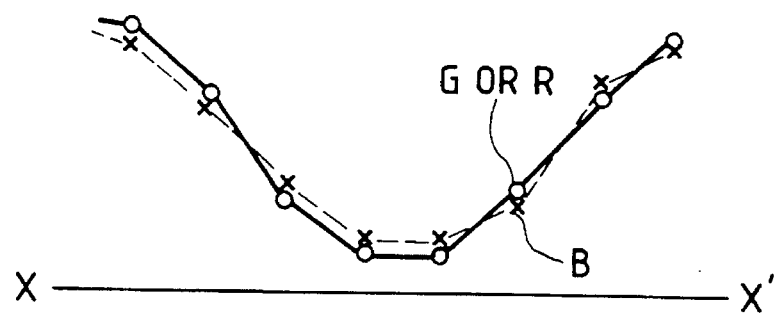

FIGS. 5A to 5C are views for explaining effects obtained when the smoothing circuits of this embodiment are used.

When a letter "A" in a single black color shown in FIG. 5A is read, FIG. 5B shows a G or R signal level and a B signal level in an X–X' section of FIG. 5A. In the 3-line CCD, since only B pixels have a wider sub-scan opening, as shown in FIG. 12, a B signal (indicated by a broken curve in FIG. 5B) has lower spatial frequency gain characteristics (MTF) than an R or G signal (solid curve). Therefore, a pixel to be judged undesirable has chromaticity in regions Ⓐ and Ⓑ in FIG. 5B, and causes a judgment error of achromaticity.

Thus, the R and G signals are smoothed in the sub scan direction to match levels of the three signals with each other, as shown in FIG. 5C, thereby preventing a judgment error of chromaticity, i.e., a chromatic/achromatic level.

FIG. 1 is a block diagram of color signal processing based on the black area judgment signal, and best illustrates the present invention.

The apparatus shown in FIG. 1 includes an image read unit 800, a LOG conversion unit 801, a masking calculation unit 802, a UCR (undercolor removal) unit 803, and a selector 804.

R, G, and B signals input by the image read unit (e.g., a CCD) 800 are subjected to LOG conversion in the LOG conversion unit 801 and then masking calculations in the masking calculation unit 802 so as to be converted to Y, M, and C signals. The Y, M, and C signals are then subjected to UCR processing in the UCR unit 803. Thus, Y', M', and C' signals are input to the selector 804.

Meanwhile, the R and G signals are input to the smoothing circuit to match their MTF with that of the B signal, and the R, G, and B signals are sent to a black area judgment unit 806. The unit 806 executes the black area judgment shown in FIG. 1. When the black area judgment unit 806 judges that the corresponding pixel is a black area, the selector 804 selects Y", M", C", and Bk" as outputs y (yellow), m (magenta), c (cyan), and bk (black).

Figure 9:
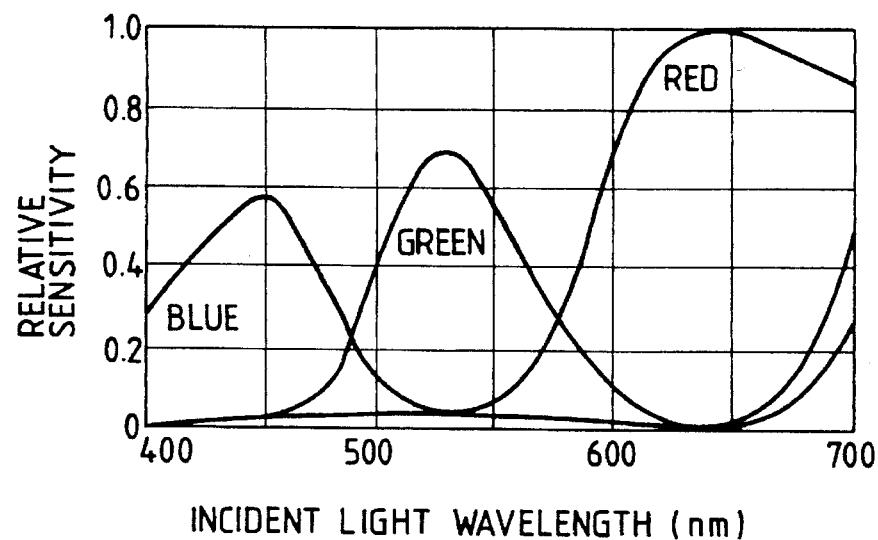
FIG. 9 is a graph showing Red, Blue, and Green spectral sensitivity characteristics.

Note that Y", M", and C" are outputs from a 0 data generation unit 805, and their values are "0". Therefore, the values of the outputs y, m, and c from the selector become "0". Meanwhile, "Bk" is obtained by logarithmically converting the G (green) signal of the input color signals, and then density-correcting the converted signal using to LUT (look-up table) 808. Of three primary color signals R (red), G (green), and B (blue), the G signal is used because the G signal is closest to a neutral density image (ND image), as shown in the graph of FIG. 9 showing spectral sensitivity characteristics of the R, G, and B sensors. More specifically, in a method of performing calculations using R, G, and B signals to generate an ND signal (e.g., a Y signal in NTSC), sharpness of an image may be impaired due to the influence of the position offset among the R, G, and B signals. In contrast to this, if a single-color G signal is used as an output for a black area, the circuit arrangement can be simplified, and degradation of MTF can be prevented.

On the other hand, when the black area judgment unit 806 judges that the corresponding pixel is not a black area, the selector 804 selects Y', M', C', and Bk', and outputs them to a printer 809 as the outputs y, m, c, and bk.

When three, i.e., R, G, and B primary color filters are used in the image read unit 800 of this embodiment, a single-color G signal is used as an output for a black area. The same applies to a case wherein other filters, e.g., C (cyan), Y (yellow), and W (white) color filters are used. In this case, an output for an achromatic area is made based on a single-color W signal without performing calculations using all the Y, M, and C signals. As a result, the circuit arrangement can be simplified, and degradation of MTF can be prevented, thus providing the same effect as described above.

In this embodiment, only a signal for black area judgment is smoothed, and signals associated with those (Y, M, C) used in actual print-out are not smoothed, thus preventing sharpness of an image from being lost.

As described above, according to the present invention, of color component signals used for judging a degree of a chromatic/achromatic color, a signal having relatively higher spatial frequency gain characteristics is smoothed, while signal components having poor spatial frequency gain characteristics are not smoothed, so that a chromatic/achromatic judgment error caused by a change in color can be prevented. In particular, in this embodiment, the R,G,B 3-line sensor is used, and it was demonstrated that a position shift in the sub scan direction was increased.

In order to prevent this, three pixels in the sub scan direction are smoothed, thus effectively eliminating color misregistration caused by a position shift due to, e.g., a vibration of the driving motors for the mirrors.

In the above embodiment, an image is read by the 3-line sensor. However, the present invention is not limited to this, but is applicable to a reading means such as a mosaic type line sensor in which filters are aligned in the order of R, G, and B, or a line sensor in which filters are aligned in the order of R, G, B, G, R, G, B, G, ....

Second Embodiment

In the first embodiment, the 3-line sensor for full-color reading has been exemplified. However, the present invention is not limited to this.

Figure 15:
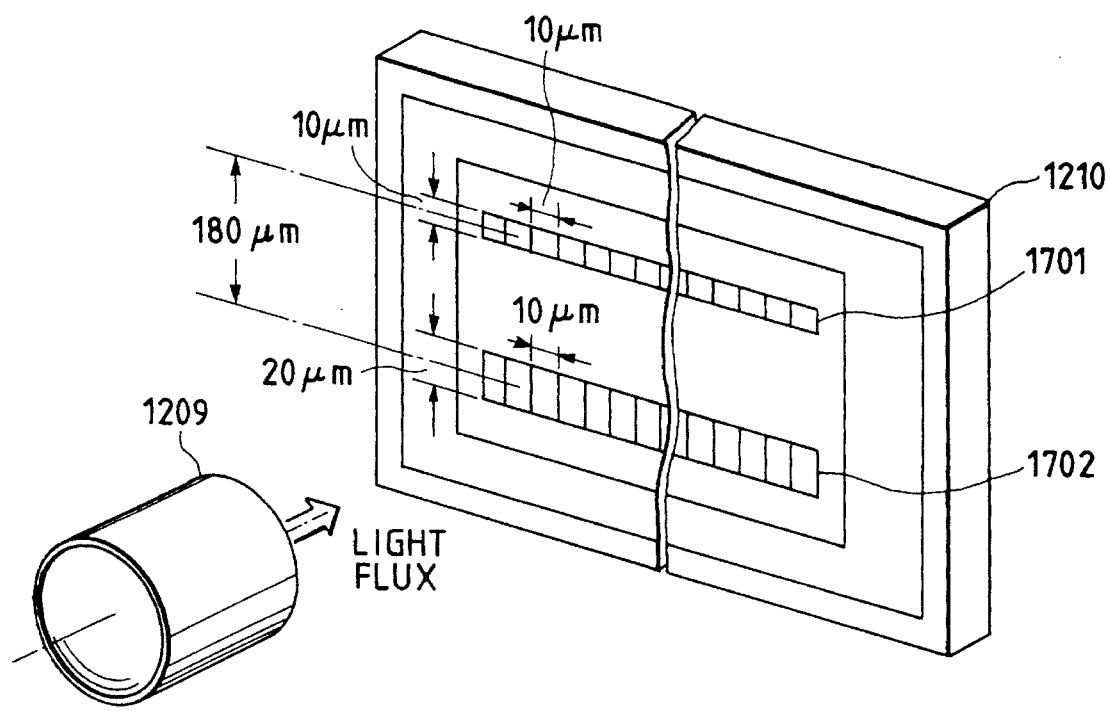
FIG. 15 is a perspective view showing a CCD sensor according to the second embodiment of the present invention.

For example, the present invention is applicable to processing by a 2-line sensor for reading two, e.g., red and white images, as shown in FIG. 15.

In FIG. 15, a combination of a white component sensor 1701 and a sensor 1702 with a red filter perform red/white judgement. In this case, the sensor 1702 has a larger opening than that of the sensor 1701 since it has a lower sensitivity due to the presence of the red filter. Only the output from the sensor 1701 is smoothed to perform judgment like in the first embodiment, thus obtaining the same effect as in the first embodiment described above.

In the above embodiment, smoothing is performed using three pixels in the sub scan direction. However, smoothing may be performed in only the main scan direction or in both the main and sub scan directions. The number of pixels to be smoothed is not limited to 3.

Input color component signals are not limited to R, G, and B signals but may be Y (yellow), M (magenta), and C (cyan) signals.

The chromatic/achromatic algorithm is not limited to that in the above embodiment. That is, the present invention is applicable as long as a chromatic/achromatic level of an input image is judged using a plurality of input color component signals.

A judgment means for judging using the a chromatic/achromatic judgment signal 116 for each pixel obtained by the above-mentioned black area judgment unit 806 whether an image of one frame read by the image read unit 800 may be arranged. For a monochrome image, an image formation process using only bk is performed, and processes for remaining y, m, and c may be omitted. More specifically, a means for counting the judgment signals 116 for one frame, and for, if the number of pixels which are judged to be chromatic pixels is 0 or smaller than a predetermined value, judging a monochrome image may be arranged.

As described above, for color component signals input to the black area judgment unit 806, since another signal processing (e.g., smoothing or edge emphasis) is performed for some of a plurality of color component signals in consideration of spatial frequency gain characteristics, chromatic/achromatic judgment can be accurately executed in units of pixels. Meanwhile, as color component signals to be used for printing, signals read by the image read unit 800 are used. Therefore, the spatial frequency characteristics can be prevented from being impaired by smoothing, thus obtaining a sharp reproduced image.

As described above, according to the present invention, a judgment error during chromatic/achromatic judgment of an input image can be prevented, and proper image processing can be executed.

Third Embodiment

An arrangement of a 3-line sensor according to the third embodiment of the present invention will be described below.

Figure 16:
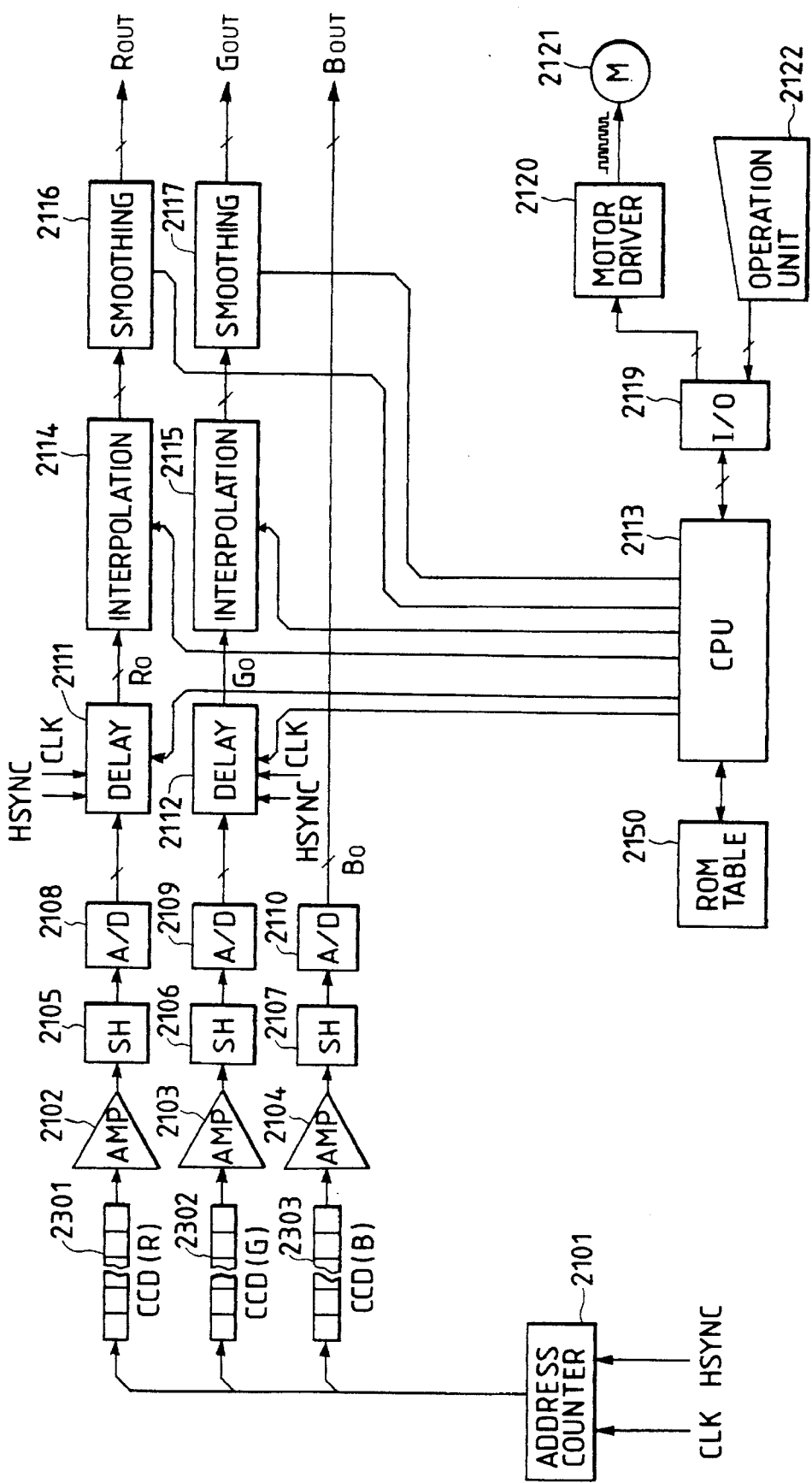
FIG. 16 is a block diagram showing signal processing according to the third embodiment of the present invention.

FIG. 16 is a block diagram of a sensor unit of the image processing apparatus of this embodiment. The sensor unit shown in FIG. 16 includes an R (red) color sensor (CCD) 2301, a G (green) color sensor (CCD) 2302, a B (blue) color sensor (CCD) 2303, amplifiers 2102 to 2104 for amplifying analog signals read by the CCDs 2301 to 2303, sample & hold circuits 2105 to 2107, A/D converters 2108 to 2110, an R sensor signal delay memory 2111, a G sensor signal delay memory 2112, a CPU 2113, an R sensor signal interpolation section (or interpolator) 2114, a G sensor signal interpolator 2115, smoothing circuits 2116 and 2117, and an address counter 2101 for driving the sensors 2301 to 2303 with the same clock. The address counter 2101 generates a pixel clock (CCD transfer clock) in synchronism with the horizontal sync signal (HSYNC) sent from a printer or a microprocessor 1601 shown in FIG. 14.

Figure 22:
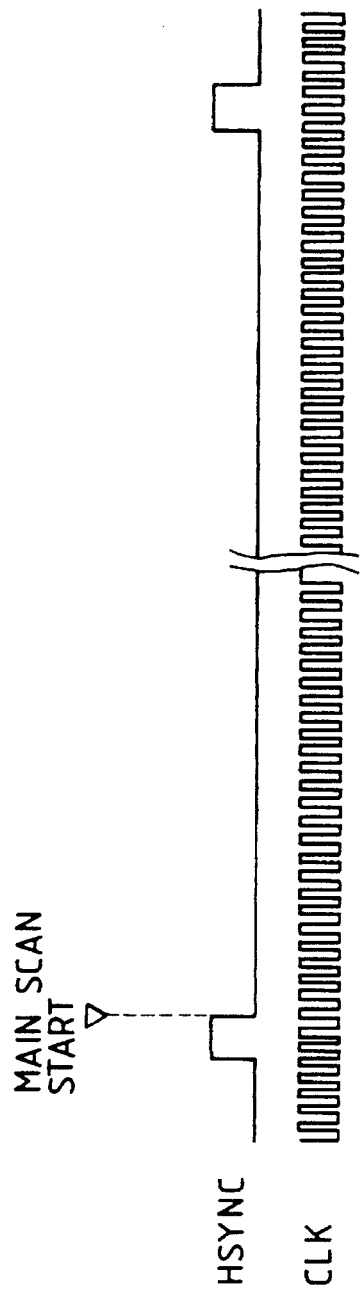
FIG. 22 is a timing chart showing HSYNC and CLK signals input to an address counter.

In FIG. 16, the HSYNC signal for main scan reading and the transfer clock signal CLK for image data are generated at timings shown in FIG. 22. An I/O port 2119 is connected between the CPU, an operation unit 2122, and a motor driver 2120. A ROM 2150 stores data to be set in respective units according to a magnification factor.

In the above arrangement, the following processing is executed.

The CCDs 2301 to 2303 respectively read R, G, and B analog image signals on the basis of a read address signal from the address counter 2101.

The arrangements of the delay memories 2111 and 2112 and the interpolators 2114 and 2115 are the same as those in FIG. 14, and a detailed description thereof will be omitted.

Figure 17A:
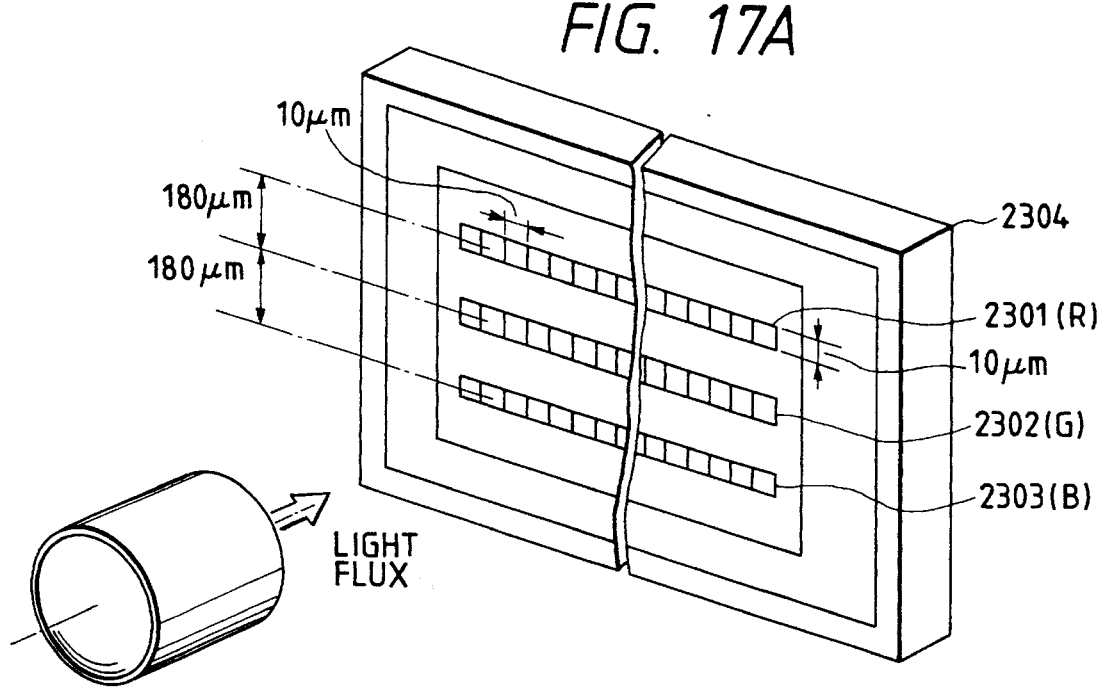
FIGS. 17A and 17B are perspective views showing arrangements of 3-line parallel color sensors.

FIG. 17A shows an arrangement of a 3-line parallel color sensor. The sensor is constituted by the R, G, and B line sensors 2301 to 2303, and a color sensor IC body 2304.

In this embodiment, an interval between the adjacent line sensors is 180 µm, and a sensor pixel width is 10 µm. The R and G signal delay memories 1601 and 1602 in FIG. 14 respectively comprise 36- and 18-line memories as memory sizes necessary in an equi-magnification read mode.

Figure 17B:
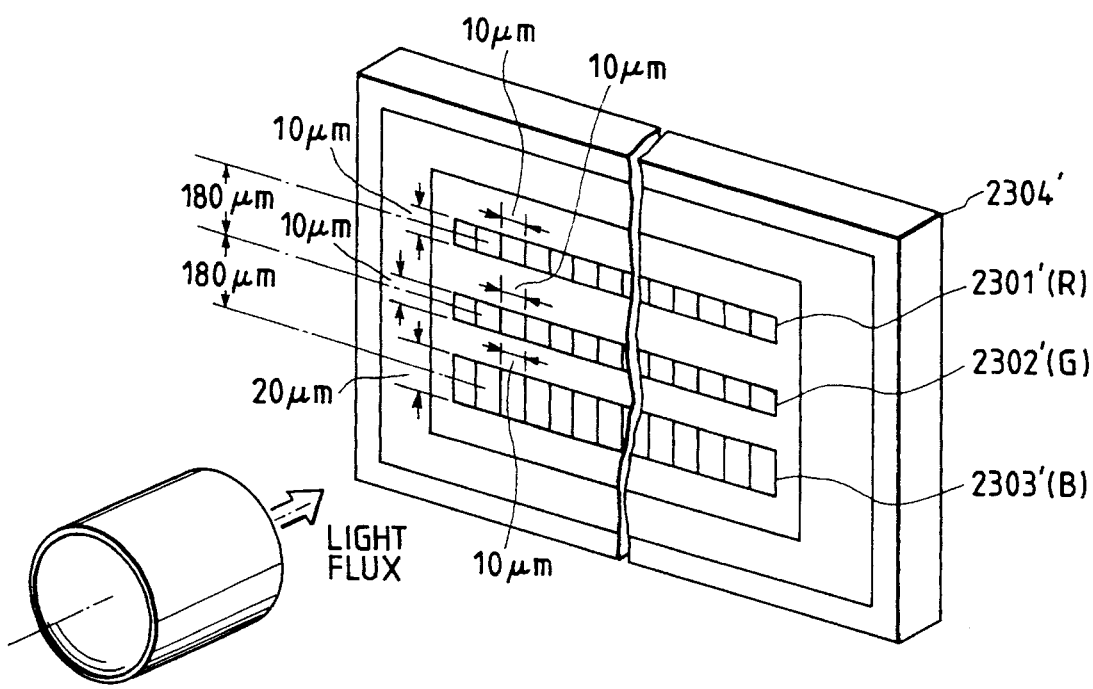

The line sensor may be arranged, as shown in FIG. 17B.

A red component (R) line sensor 2301' includes a plurality of light-receiving elements whose surfaces are covered with a filter for allowing only a red light component to pass therethrough. Similarly, a green component (G) line sensor 2302' includes a plurality of light-receiving elements whose surfaces are covered by a filter for allowing only a green light component to pass therethrough, and a blue component (G) line sensor 2303' includes a plurality of light-receiving elements whose surfaces are covered by a filter for allowing only a blue light component to pass therethrough.

These line sensors are arranged parallel and adjacent to each other at a pitch of 180 µm. The B line sensor comprises a 20 µm×10 µm light-receiving element array, and the R and G line sensors comprise 10 µm×10 µm light-receiving element arrays, respectively. The B line sensor and the R and G line sensors have different light-receiving areas of the light-receiving elements for the following reason. That is, in general, in a blue component transmission filter, a transmittance of blue light tends to be lower than that of red/green light in a red/green component transmission filter. Therefore, in order to improve an S/N (signal/noise) ratio of a signal, the light-receiving area of only the B light sensor is increased to match its level with those of R and G signals. More specifically, the widths of the filters need not always be the same, but may be appropriately determined according to transmission characteristics to match levels of the signals.

In this embodiment, in order to allow a variable magnification from 100% to 400% in the sub scan direction, the R and G delay memories 1601 and 1602 shown in FIG. 14 respectively comprise 144- and 72-line memories.

Figure 18:
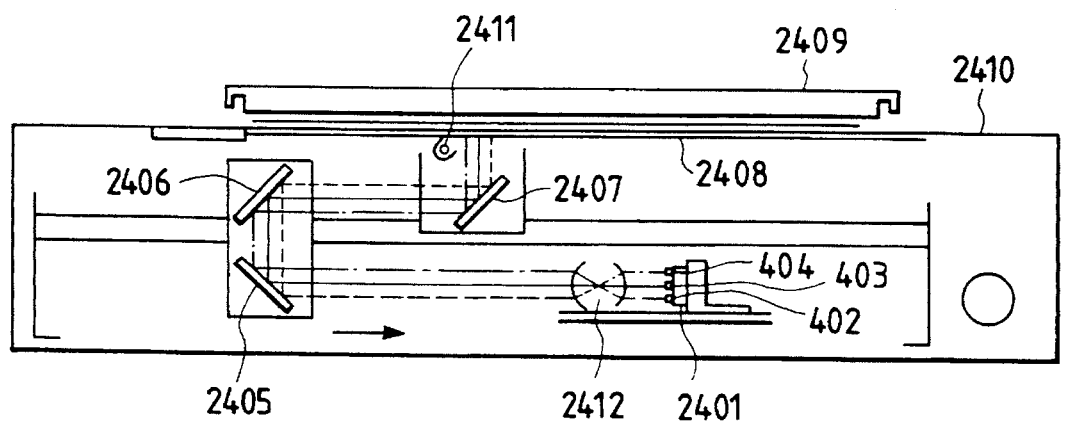
FIG. 18 is a sectional view showing an arrangement of a read unit.

FIG. 18 shows an arrangement of the read unit.

The read unit includes a color sensor IC main body 2401, an R line sensor 2402, a G line sensor 2403, a B line sensor 2404, a third reflection mirror 2405, a second reflection mirror 2406, a first reflection mirror 2407, an original glass 2408, an illumination lamp 2411 for exposing an original, a focusing lens 2412, and a read unit body 2410. An original is scanned in a direction of an arrow in FIG. 18.

The block diagram of the read unit is the same as FIG. 11, and a detailed description thereof will be omitted.

Figure 19:
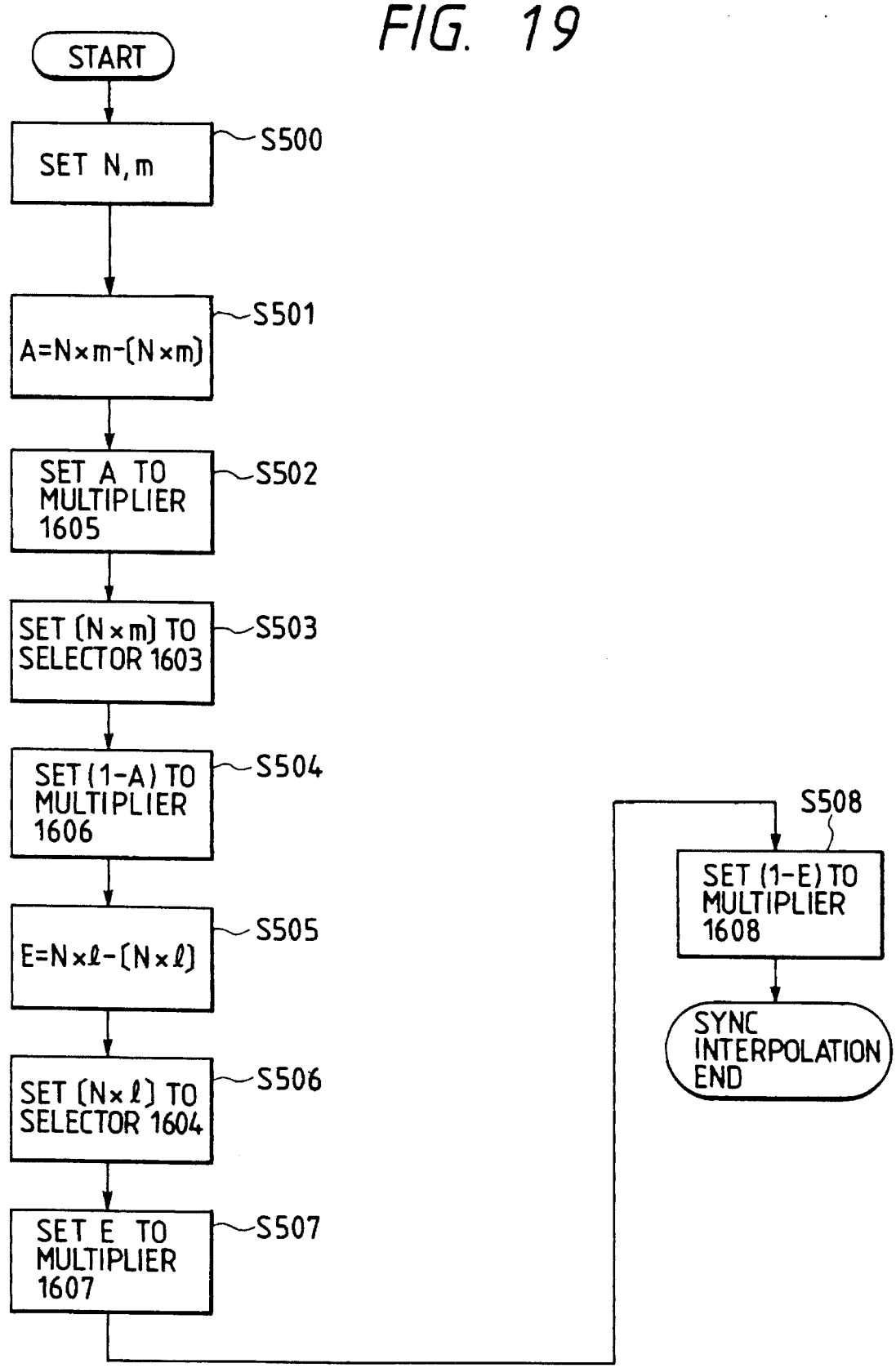
FIG. 19 is a flow chart showing processing of a microprocessor.

FIG. 19 is a flow chart of a microprocessor 1611 shown in FIG. 14.

The processing will be described below with reference to FIG. 19.

Variable magnification factors N and m are assumed to be values each obtained by dividing a distance between the R and B sensors by a sub-scan distance or a sub-scan read pixel pitch of the sensor.

Assuming a case wherein a sub-scan variable magnification of 105% is attained, N=1.05. As described above, since m=36 in this embodiment, the number of pixels included in an interval between the R and G line sensors is N×m=1.05×

36=37.8 (pixels). Note that N×m is a read pixel count between sensors at a magnification factor N.

In the FIFO memory 1601 in FIG. 14, pixel data of a +37th line is represented by D(37), pixel data of a +38th line is represented by D(38), and an R (red) signal corresponding to the same position as an original position presently read by the B (blue) sensor is obtained by a linear calculation given by equation (1):

$$D(37.8)=0.2 \times D(37)+0.8 \times D(38) \qquad (1)$$

Control corresponding to the above-mentioned interpolation processing is executed by the microprocessor 1611.

In step S500, N and m are set, and in step S501, the microprocessor 1611 calculates equation (2):

$$A = N \times m - [N \times m] \qquad (2)$$

where [ ] represents integer processing for rounding off a decimal part.

In this embodiment, since m=36, when a sub-scan variable magnification factor of 105% is to be set, we have:

$$A = 36 \times 1.05 - [36 \times 1.05] = 0.8 \qquad (3)$$

In step S502, the microprocessor 1611 sets a coefficient A as a multiplication coefficient in the multiplier.

In step S503, a value of [N×m] is calculated, and the result is set in the selector 1603. The value [N×m] is an integer part of a sub-scan pixel interval between the R and B line sensors. When m=36 and N=1.05, [N×m]=37. Therefore, the microprocessor 1611 sets the selector 1603 so that the data D(37) (pixel data of the +37th line) in the FIFO memory 1601 is supplied to the multiplier 1606, and the data D(37+1) in the FIFO memory 1601 is supplied to the multiplier 1605.

In step S504, a value of (1−A) is calculated, and the result is set in the multiplier 1606 as a multiplication coefficient. Thus, equation (1) is calculated, thereby obtaining R data.

In step S505, in order to obtain G data, equation (4) is calculated:

$$E = N \times l - [N \times l] \qquad (4)$$

where N is the variable magnification factor, and l is a value obtained by dividing the distance between the G and B sensors by the sub-scan distance of the sensor or a read pixel pitch in the equi-magnification mode. In other words, l is a G signal delay line count in the equi-magnification mode.

Since l=18 in this embodiment, in order to attain the sub-scan variable magnification of 105%, since N=1.05 and N×l=18.9, the following equation must be calculated:

$$D(18.9)=0.1 \times D(18)+0.9 \times D(19) \qquad (5)$$

Therefore, the following value is set:

$$E = 18 \times 1.05 - [18 \times 1.05] = 0.9 \qquad (6)$$

In step S506, a value of [N×l] is calculated, and the result is set in the selector 1604. The value of [N×l] corresponds to an integer part of a sub-scan pixel interval between the G and B line sensors. When l=18 and N=1.05, [N×l]=18. Thus, the microprocessor 1611 sets the selector 1604 so that the data D(18) (pixel data of the +18th line) in the FIFO memory 1601 is supplied to the adder 1608, and the data D(18+1) in the FIFO memory 1602 is supplied to the multiplier 1607.

In step S507, the value E=0.9 is set in the multiplier 1607 as a multiplication coefficient. In step S508, the value (1−E)=0.1 is set in the multiplier 1608 as a multiplication coefficient. In this manner, equation (4) is calculated, and G data D(18.9) is obtained.

In the above case, m and l are integers. However, it is difficult to accurately generate distances between the R and B sensors and between the G and B sensors in practice. For example, when the sub-scan distance of the sensor (or the sub-scan read pixel interval in the equi-magnification mode) is assumed to be 10 µm and when the distance between the R and B sensors is 365 µm and the distance between the G and B sensors is 178 µm, m=36.5 and l=17.8. In this case, interpolation processing is required in the equi-magnification mode, i.e., when N=1.0, and equations (1) and (4) are rewritten as follows:

$$A' = 1 \times 36.5 - [1 \times 36.5] = 0.5 \therefore D(36.5) = 0.5 \times D(36) + 0.5 \times D(37) \qquad (1)'$$

$$E' = 1 \times 17.8 - [1 \times 17.8] = 0.8 \ D(17.8) = 0.2 \times D(17) + 0.8 \times D(18) \qquad (2)'$$

In either case, the processing can be realized by the flow chart shown in FIG. 19.

Figure 23:
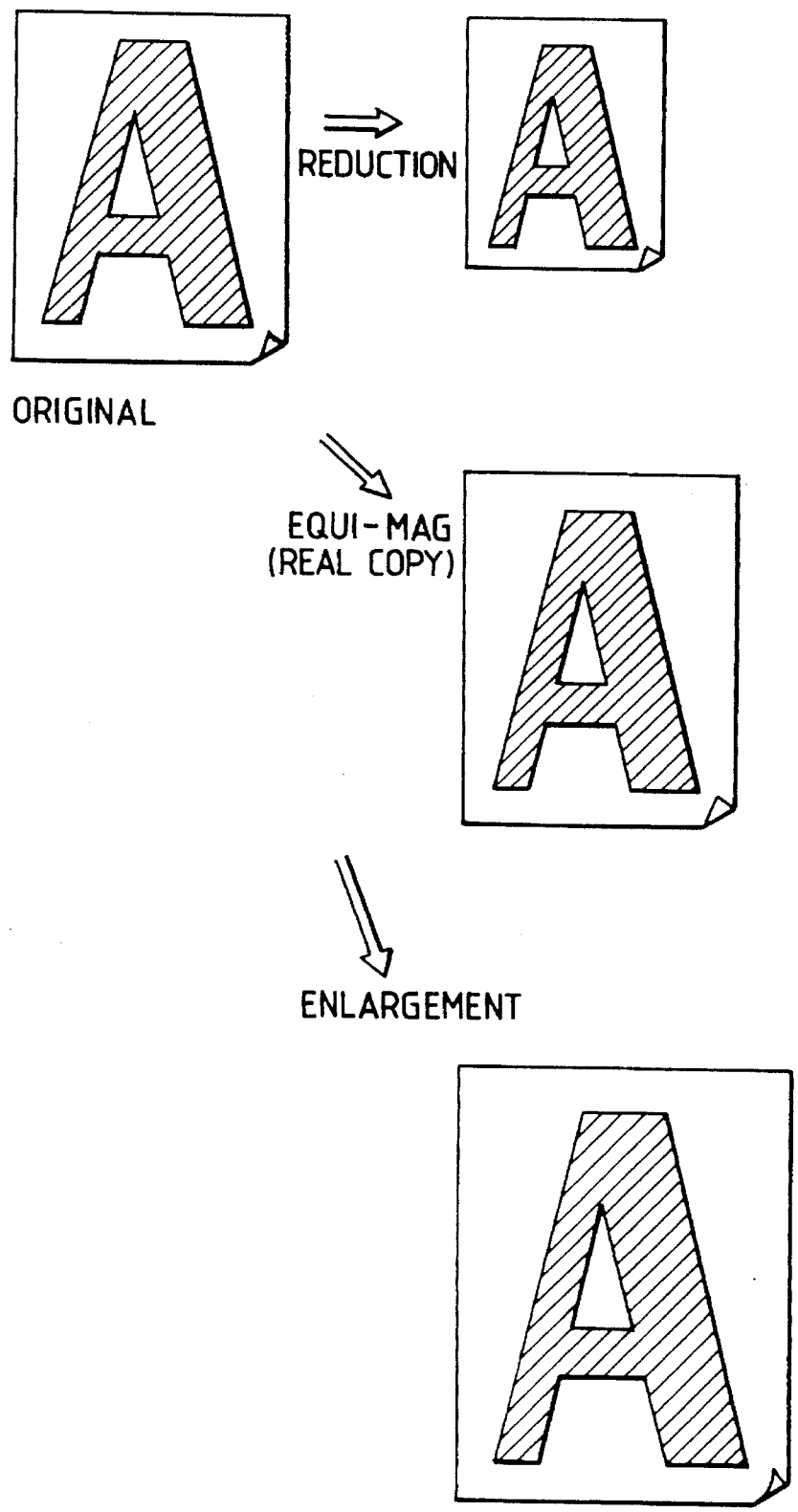
FIG. 23 is a view showing a reading state in a variable magnification mode.

In this manner, predetermined electrical signal processing is executed, so that image data can be loaded at a desired magnification factor, as shown in FIG. 23.

The arrangement and operation of the read unit using the 3-line sensor will be described below with reference to FIGS. 20 and 21.

Figure 20:
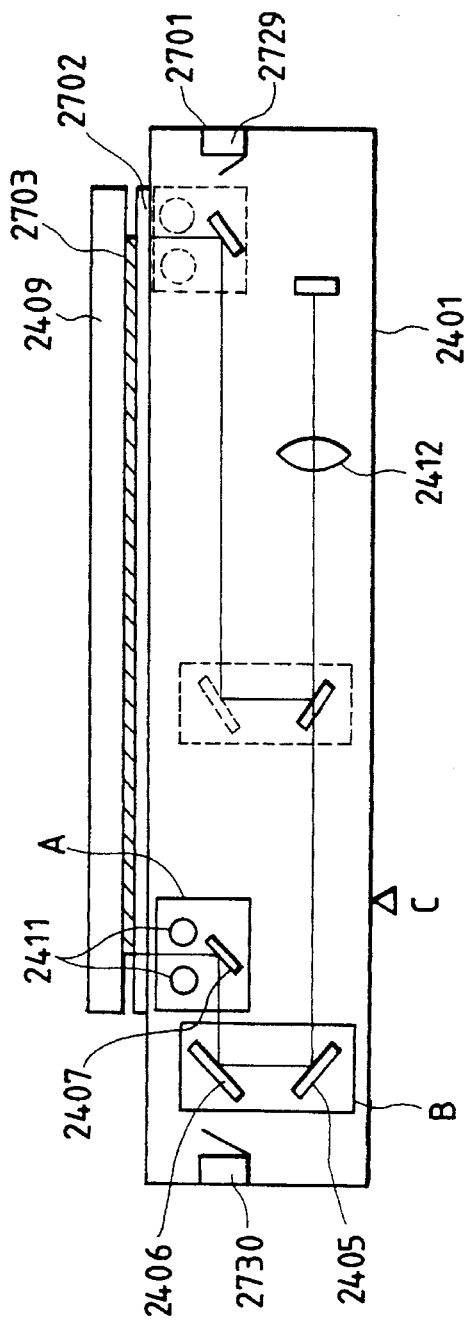
FIG. 20 is a sectional view for explaining an operation of the read unit.
Figure 21:
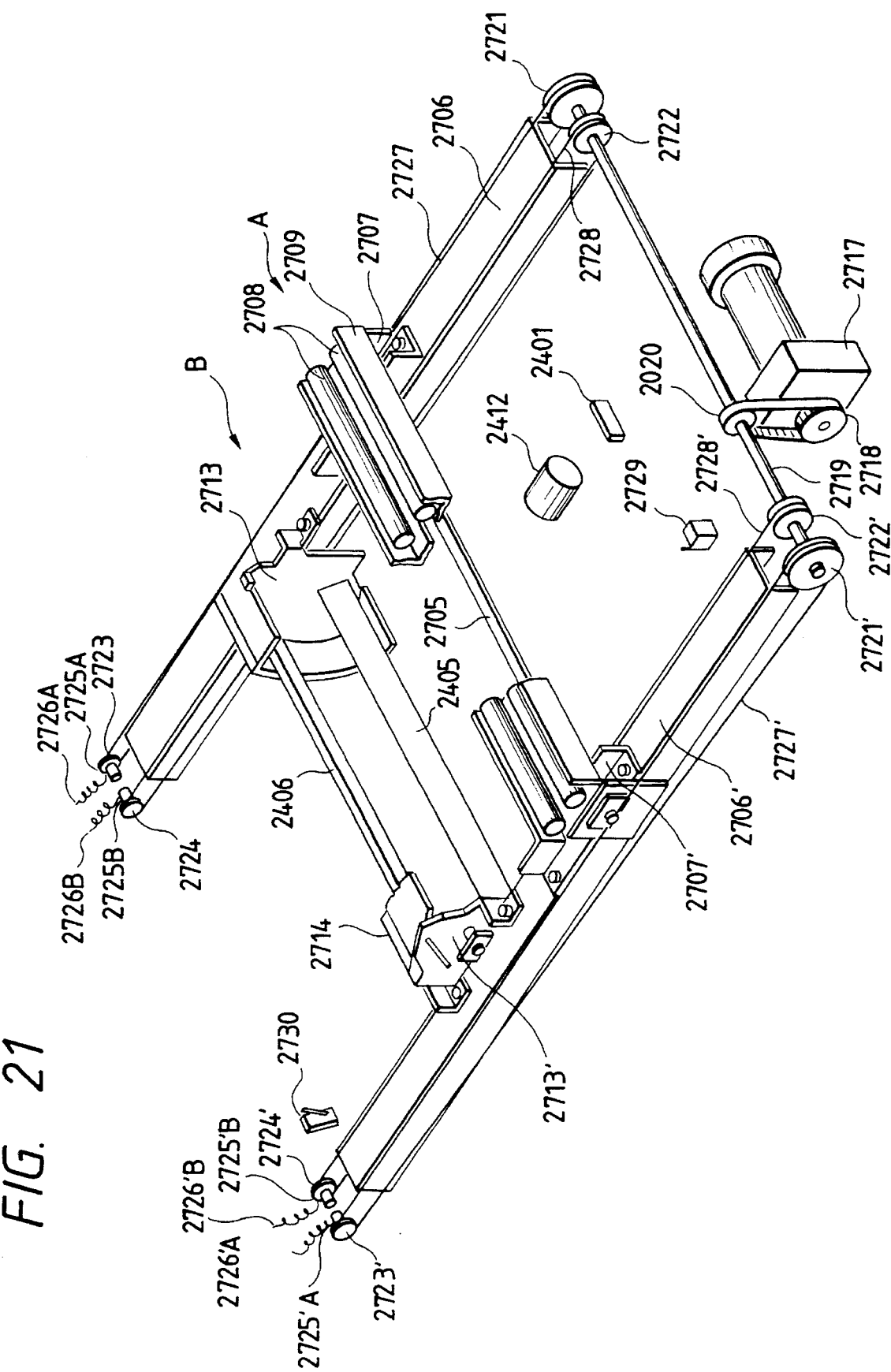
FIG. 21 is a perspective view showing a structure of the read unit.

In FIGS. 20 and 21, the read unit includes a housing 2701, an original glass (platen) 2702, and an original pressing plate 2409 for pressing an original. A first mirror 2407 is supported on support members 2707 and 2707' which are slidable along rails 2706 and 2706'. A lamp 2411 illuminates the original 2703. The lamp 2411 and a lamp cover 2709 are fixed to the support members, and they are moved together, thus constituting a first mirror unit A. Second and third mirrors 2406 and 2405 are supported on support members 2713 and 2713' slidable along the rails 2706 and 2706'. The support members 2713 and 2713' are held by a second mirror cover 2714, and they are moved together, thus constituting a second mirror unit B. The first and second mirror units A and B are synchronously moved in the same direction at a speed ratio of 2:1.

The read unit also includes a focusing lens 2412, a CCD (charge-coupled device) 2401, a motor 2717, a timing belt 2718, and a driving shaft 2719. A driving pulley 2720, large pulleys 2721 and 2721', and small pulleys 2722 and 2722' each having a diameter half that of the large pulley are fixed on the driving shaft 2719, and these pulleys are synchronously rotated. Tension pulleys 2723, 2723', 2724, and 2724' are arranged in the read unit on the other side of the driving shaft 2719. Springs 2726A, 2726A', 2726B, and 2726B' are attached to rotational shafts 2725A, 2725A', 2725B, and 2725B' of the tension pulleys 2723, 2723', 2724, and 2724'.

The two end portions of each of long wires 2727 and 2727' are attached to a corresponding one of the first mirror support members 2707 and 2707'. The long wires 2727 and 2727' are wound around the large pulleys 2721 and 2721' several turns each, and are wound around the tension pulleys 2723 and 2723' half a turn each. A tension of 3 to 4 kg is applied to the long wires 2727 and 2727' by the springs 2726A and 2726A'. Upon rotation of the large pulleys 2721 and 2721', the rotational forces are transmitted to the support members 2707 and 2707' via the long wires 2727 and 2727', thus sliding the first mirror unit A.

The two end portions of short wires 2728 and 2728' are attached to a corresponding one of the second and third mirror support members 2713 and 2713'. The short wires 2728 and 2728' are wound around the small pulleys 2722 and 2722' several turns each, and are wound around the tension pulleys 2724 and 2724' half a turn each. A tension of 3 to 4 kg is also applied to the short wires 2728 and 2728' by the springs 2726B and 2726B'. Upon rotation of the small pulleys 2722 and 2722', the second mirror unit B is slid.

When the original 2703 is set on the platen 2702 and a read key (not shown) is depressed, the lamp 2411 is turned on, and the first and second mirror units A and B located at their home positions indicated by solid lines in FIG. 20 begin to be reciprocally moved at a speed ratio of 2:1. As a result, a portion of the original surface of the original 2703, which portion extends along the longitudinal direction of the lamp 2411, is continuously and sequentially scanned. Light reflected by the original surface is slit-exposed on the CCD 2401 via the first, second, and third mirrors 2407, 2406, and 2405, and the focusing lens 2412, thus executing a read operation. In the read operation, since the first and second mirror units A and B are synchronously moved at a speed ratio of 2:1, a distance (optical path length) between the original surface and the CCD 2401 is kept constant, so that an original image can be slit-exposed without being blurred.

When the first and second mirror units A and B reach the reverse positions indicated by broken lines in FIG. 20, the lamp 2411 is turned off, and reverse movement is started. When the first mirror unit A is moved to an original read start position C, the unit A is braked, so that the first and second mirror units A and B are stopped at the home positions indicated by solid lines in FIG. 20. In a repetitive read mode, the above-mentioned operation is repeated by a preset number of times.

In this embodiment, scanning is achieved by moving the mirrors. However, an arrangement wherein a proximity sensor itself is moved along an original surface to perform scanning is also available.

In FIG. 16, analog signals read by the CCDs 2301 to 2303 are amplified by the amplifiers 2102 to 2104, and the amplified signals are then output as digital signals via the sample & hold circuits 2105 to 2107, and the A/D converters 2108 to 2110. The delay memories 2111 and 2112 comprising FIFO memories adjust delay times among lines of the 3-line CCD according to read coefficients.

The CPU 2113 sets predetermined data in the motor driver 2120 through the I/O port 2119 according to information such as a magnification factor input from the operation unit 2122. The motor driver 2120 supplies a driving signal to the motor 2121 according to the set data, i.e., a desired magnification factor, thereby scanning a read system at a predetermined speed.

Figure 24:
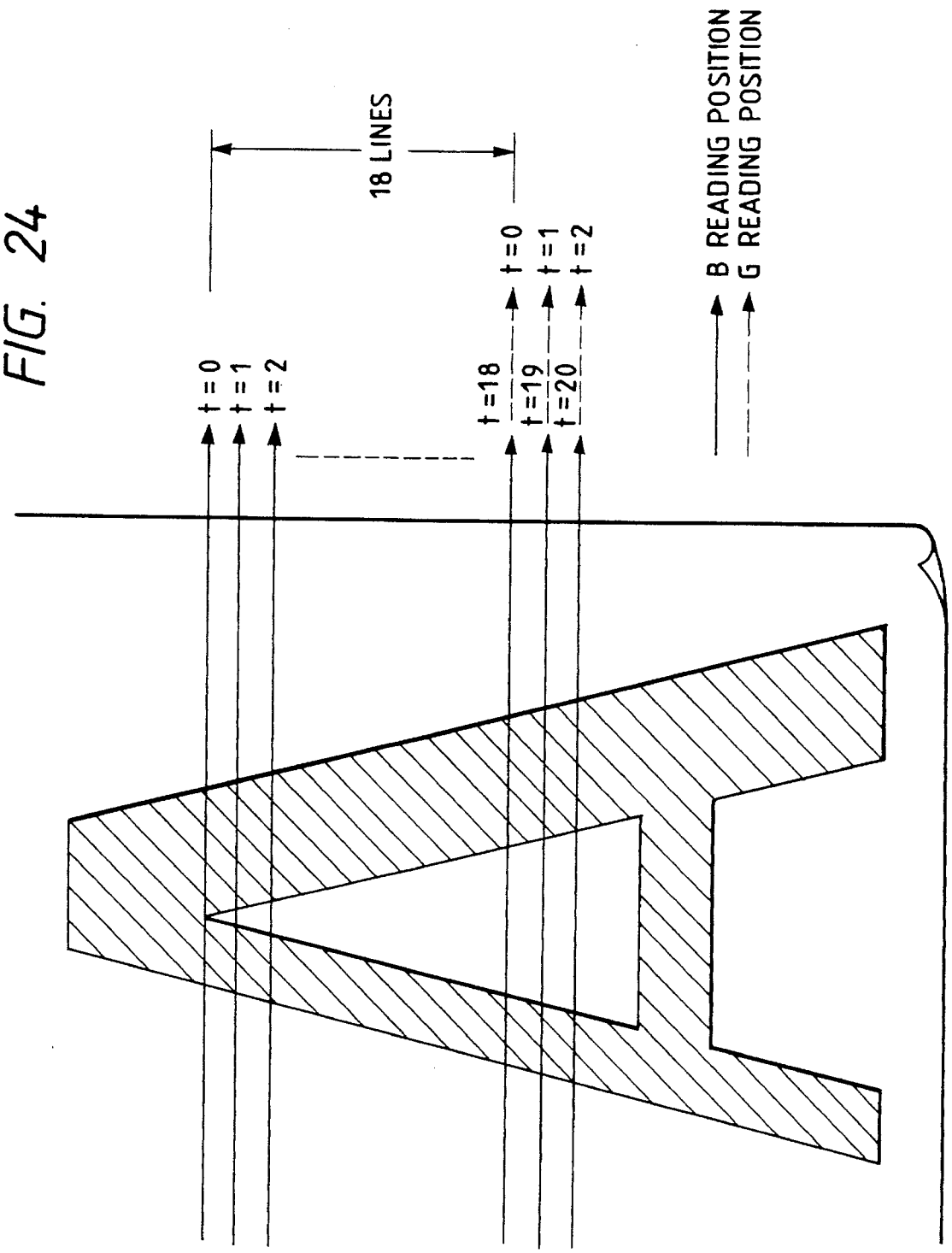
FIGS. 24 and 25 show G and B read positions.

FIG. 24 shows a case wherein an image is read at an equi-magnification factor. In FIG. 24, a solid arrow indicates the reading position of the B (blue) CCD line sensor, and a broken arrow indicates the reading position of the G (green) CCD line sensor. As can be seen from FIG. 24, these two sensors are shifted from each other by 18 lines. In other words, the G and B sensors read positions separated by 18 lines.

If a time t is represented in units of main scan periods, i.e., periods of an HSYNC signal, the G reading position at t=0 coincides with the B reading position at t=18. Thus, in order to compensate for a time difference of 18 lines, the delay memory 2112 delays a time by 18 lines according to a control signal from the CPU 2113.

Similarly, the B and R sensors are shifted by 36 lines. Therefore, the delay memory 2111 is set in advance to delay a time by 36 lines. The delay memories 2111 and 2112 can compensate for a time difference among three, i.e., R, G, and B signals, that is, a shift in reading positions (spatial shift) of the R, G, and B three line sensors.

Figure 25:
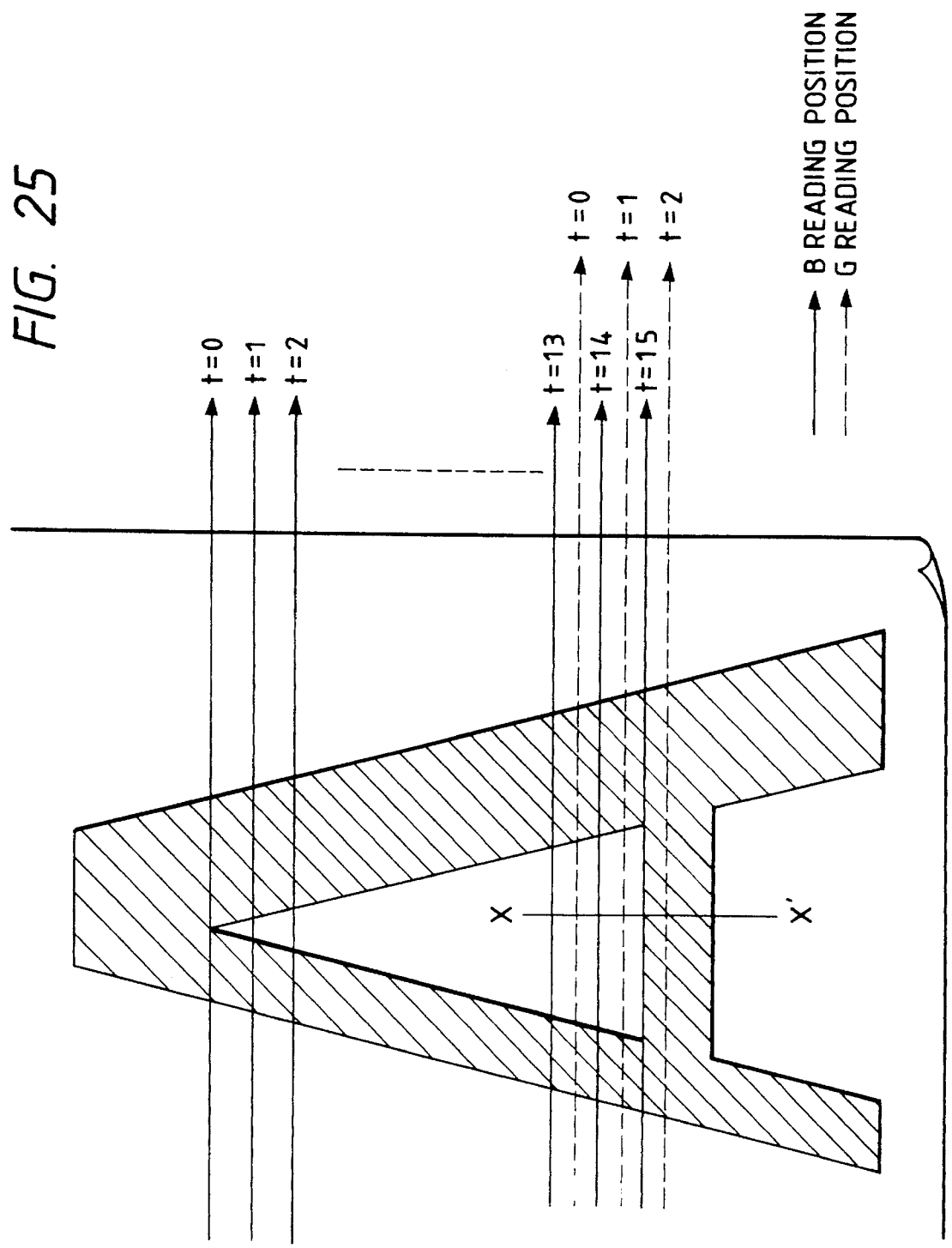
Figure 26:
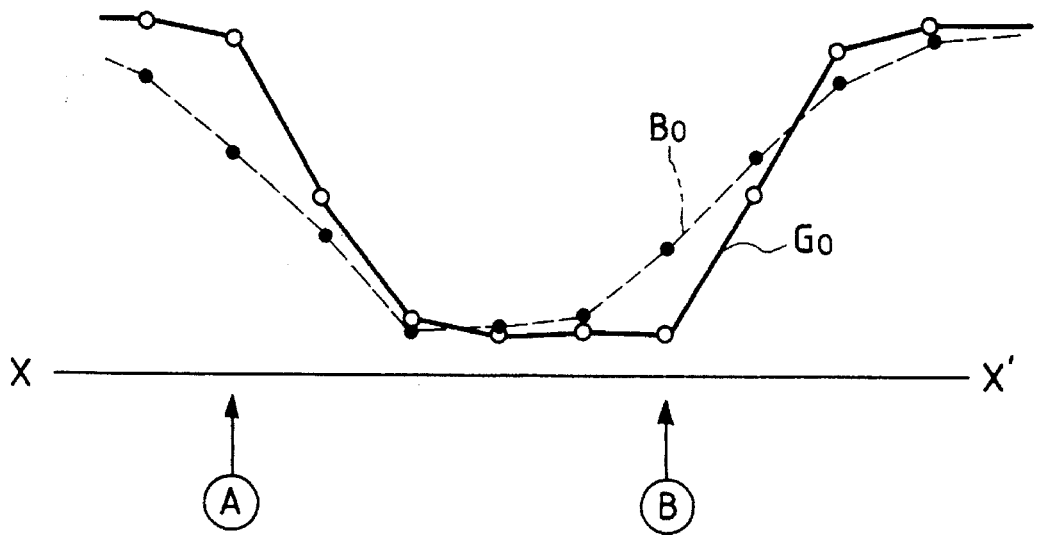
FIGS. 26 and 27 are charts for explaining G and B color misregistration states.

FIG. 26 shows a case wherein an image is read while being reduced. FIG. 25 shows the positional relationship between the reading positions of the B and G sensors when an image is read while being reduced to 75%.

When an original image is read while being reduced to 75%, a sub-scan speed of an optical system becomes 4/3 V where V is the sub-scan speed in the equi-magnification mode. Therefore, as shown in FIG. 25, the same position as that read by the G line sensor at time t=0 cannot be read by the B line sensor. That is, at time t=0, the G sensor reads a line sandwiched between lines respectively read by the B sensor at times t=13 and t=14. FIG. 26 shows signal levels of the B and G sensors in an X–X' section in FIG. 25 in this case.

$G_0$ and $B_0$ in FIG. 26 respectively correspond to those in FIG. 16, and are output signals from the delay memories. As can be seen from these signals, a phase shift of less than one line inevitably occurs.

Since the CCD 2303' has a wider sub-scan opening, as shown in FIG. 17B, it has characteristics for passing a relatively low-frequency region in terms of a spatial frequency. For this reason, the signal $B_0$ changes more slowly than the signal $G_0$ or $R_0$.

As described above, the signals $R_0$ and $B_0$ and the signals $G_0$ and $B_0$ suffer from:

(1) a phase shift of less than one line, and
(2) a difference between spatial frequency characteristics.

For these reasons, read color misregistration occurs at points indicated by Ⓐ and Ⓑ in, e.g., FIG. 26, and an achromatic original may be undesirably colored.

These problems occur not only in a reduction mode but also in an enlargement mode. In order to solve the problem (1), according to the present invention, the interpolators 2114 and 2115 are arranged, and in order to solve the problem (2), the smoothing circuits 2116 and 2117 are arranged. The interpolators and the smoothing circuits will be described below.

[Interpolator]

Figure 28:
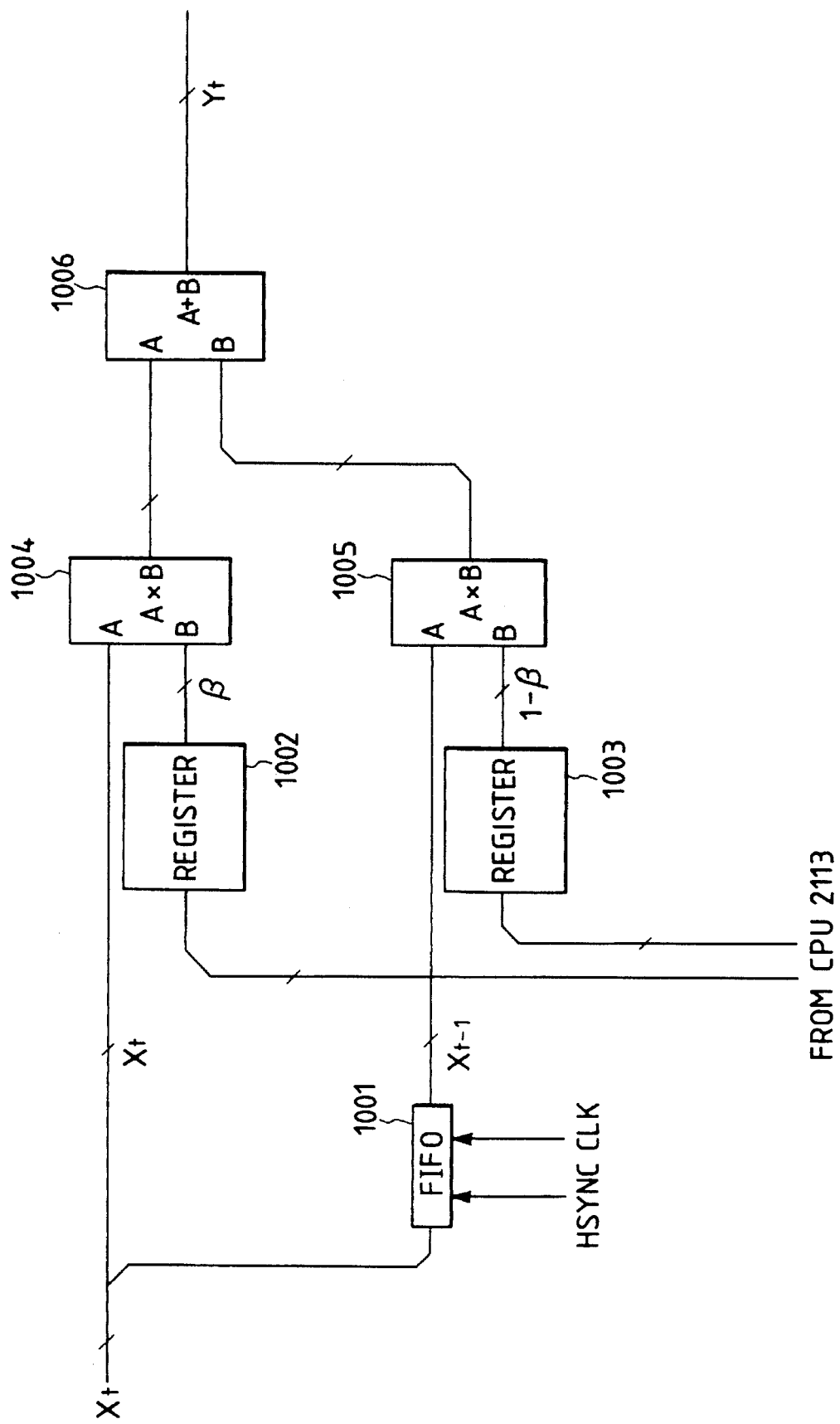
FIG. 28 is a circuit diagram showing an interpolation circuit.

The interpolators 2114 and 2115 are identical circuits, and are arranged as shown in FIG. 28. More specifically, each interpolator comprises a first-in first-out memory (FIFO) 1001 for achieving one-line delay, registers 1002 and 1003, multipliers 1004 and 1005, and an adder 1006. Interpolation factors $\beta$ and $1-\beta$ calculated in advance by the CPU 2113 are written in the registers 1002 and 1003, and are multiplied with an input signal $X_t$ and a signal $X_{t-1}$ of the immediately preceding line by the multipliers 1004 and 1005, respectively. The two products are added to each other by the adder 1006 to output $Y_t$.

More specifically, the signal $X_{t-1}$ delayed by one line from the input signal $X_t$ is held, and the output $Y_t$ is given by:

$$Y_t = \beta X_t + (1-\beta) X_{t-1}$$

The interpolation factor $\beta$ satisfies the relation $0 \leq \beta \leq 1$, and $\beta$ can be set to be a predetermined value to generate a signal arbitrarily delayed by less than one line.

When $\beta=0$, $Y_t=X_{t-1}$, and when $\beta=1$, $Y_t=X_t$. Thus, $X_t$ and $X_{t-1}$ can be arbitrarily interpolated between $0<\beta<1$. According to this interpolator, a position shift of less than one line between line sensors can be compensated for.

$\beta$ is data sent from the CPU 2113 but may be calculated by the CPU according to a read magnification factor. Alternatively, when an operator designates a read magnification factor, the value $\beta$ corresponding to the selected magnification factor may be selected.

[Smoothing Circuit]

Figure 29:
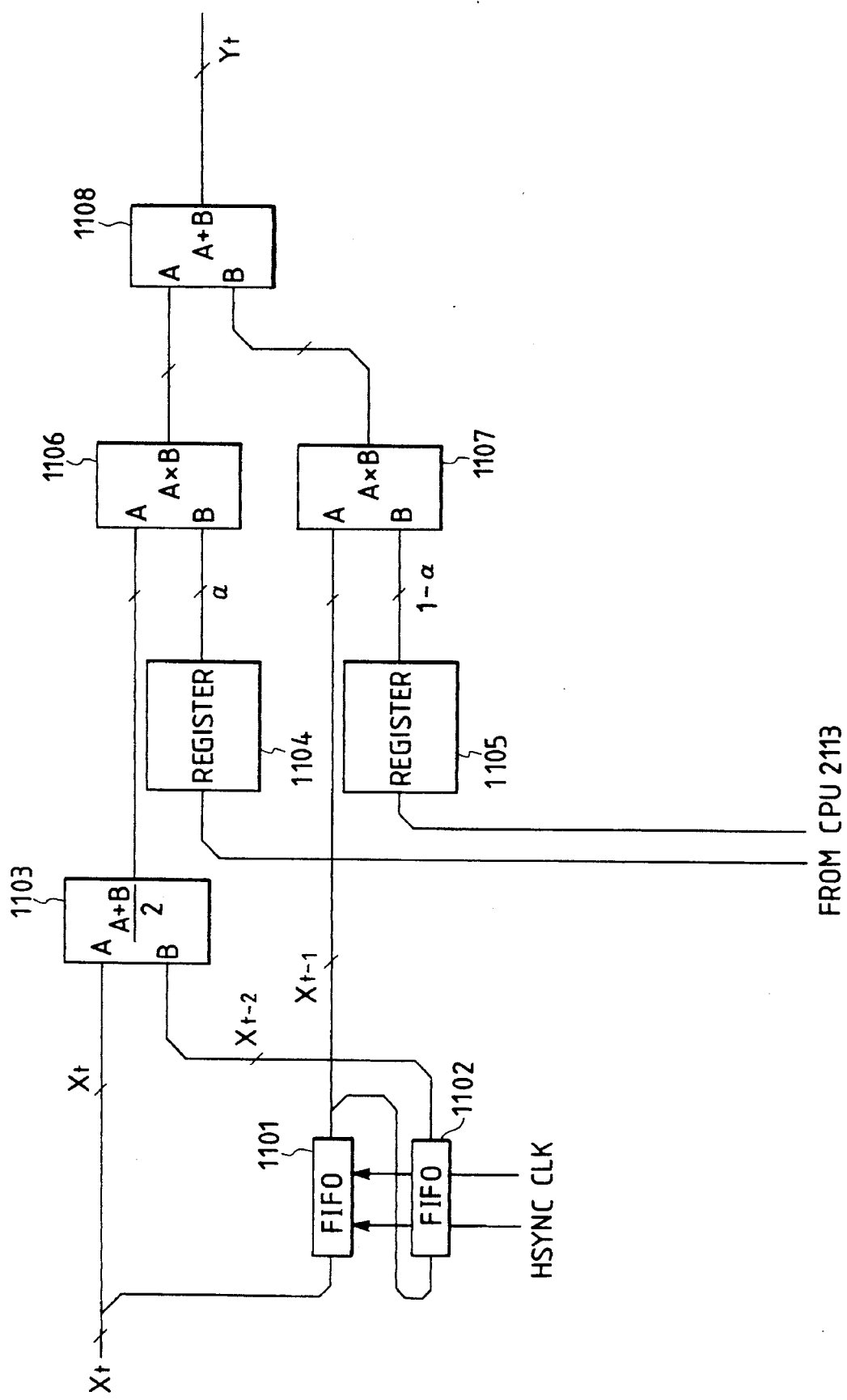
FIG. 29 is a circuit diagram showing a smoothing circuit.

The smoothing circuits 2116 and 2117 are identical circuits, and are arranged, as shown in FIG. 29. More specifically, each smoothing circuit comprises line-delay FIFOs 1101 and 1102, an adder 1103, registers 1104 and 1105, multipliers 1106 and 1107, and an adder 1108. Smoothing factors $\alpha$ and $1-\alpha$ calculated in advance by the CPU 2113 are set in the registers 1104 and 1105.

The smoothing circuit is operated as follows. The FIFOs 1101 and 1102 delay an input $X_t$ by one line and two lines, respectively. $X_t$ and $X_{t-2}$ delayed from $X_t$ by two lines are input to the adder 1103 to output an average value $(X_t+X_{t-2})/2$. The output is input to the multiplier 1106 and is multiplied with the smoothing factor $\alpha$ set in the register 1104 by the CPU 2113.

On the other hand, $X_{t-1}$ delayed by one line and $1-\alpha$ set in the register 1105 by the CPU 2113 are input to the multiplier 1107 and are multiplied with each other. The outputs from the multipliers 1106 and 1107 are input to the adder 1108, thus finally outputting $Y_t$.

As a result, we have:

$$Y_t=(\alpha/2)\times X_{t-2}+(1-\alpha)\times X_{t-1}+(\alpha/2)\times X_t$$

where $$\begin{bmatrix} Y_t : \text{Output} \\ X_t : \text{Input} \\ X_{t-1} : \text{Input delayed by one line} \\ X_{t-2} : \text{Input delayed by two lines} \\ 0 \leq \alpha \leq 1 \end{bmatrix}$$

Note that when $\alpha=0$, then $Y_t=X_{t-1}$, and an output quite free from the smoothing effect is obtained. When $\alpha=1$, then $Y_t=(X_{t-2}+X_t)/2$, and a most strongly smoothed output is obtained. When $0<\alpha<1$, the smoothing effect is enhanced as $\alpha$ becomes larger. Thus, by changing the parameter $\alpha$, a smoothing effect with an arbitrary strength can be obtained.

$\alpha$ is set in the registers 1104 and 1105 by the CPU 2113 in the same manner as $\beta$.

The operation flow of the overall apparatus will be described below with reference to the flow chart of FIG. 30. In step S2201, a read magnification factor is input from the operation unit 2122 and is determined. Furthermore, data according to the input magnification factor is set in the motor driver 2120, and the motor is rotated at a speed according to the magnification factor. As a result, the optical system 2206 is driven at:

$$V = V_{100} \times \frac{100}{m} \quad (1)$$

$$\begin{bmatrix} V_{100} : 100\% \text{ (speed at equi-magnification)} \\ m : \text{Magnification factor (\%)} \end{bmatrix}$$

In step 2202, line delay mounts $N_R$ and $N_G$ in the delay memories 2111 and 2112 are determined, that is:

$$\begin{bmatrix} N_R = [36 \times m/100] - 2 & (2) \\ N_G = [18 \times m/100] - 2 & (3) \end{bmatrix}$$

(where [ ] is the Gaussian symbol to extract an integer part)

In step S2203, interpolation factors $\beta_R$ and $\beta_G$ in the interpolators 2114 and 2115 are determined, that is:

$$\beta_R = \left\{ 36 \times \frac{100}{m} \right\} \quad (4)$$

$$\beta_G = \left\{ 18 \times \frac{100}{m} \right\} \quad (5)$$

(where { } indicates a decimal part)

In step S2204, smoothing factors $\alpha_R$ and $\alpha_G$ in the smoothing circuits 2116 and 2117 are determined.

The characteristics of the interpolators, the smoothing circuits, and the overall units will be explained below.

[Characteristics of Interpolator]

With respect to the interpolation factor $\beta(0\leq\beta\leq1)$, a transfer function is given by:

$$G_1=\beta+(1-\beta)Z^{-1}$$

(where $Z^{-1}$ is the Z conversion operator)

By replacing $Z^{-1}$ with $e^{-j\omega T}$, the frequency gain characteristics are given by:

$$|G_1|=|\beta+(1-\beta)e^{-j\omega T}| \quad (6)$$

To summarize this, we have:

$$|G_1|=\sqrt{(1-2\beta)^2+4\beta(1-\beta)\cos^2\frac{\omega T}{2}} \quad (7)$$

(where $\omega$ is the spatial angular frequency, and T is the sampling interval)

[Characteristics of Smoothing Circuit]

With respect to the smoothing factor $\alpha(0\leq\alpha\leq1)$, the transfer function of the smoothing circuit is expressed by:

$$G_2 = \frac{\alpha}{2} + (1-\alpha)Z^{-1} + \frac{\alpha}{2} Z^{-2}$$

When $Z^{-1}$ is replaced with $e^{-j\omega T}$, the frequency gain characteristics are given by:

$$|G_2| = \left| \frac{\alpha}{2} + (1-\alpha)e^{-j\omega T} + \frac{\alpha}{2} e^{-2j\omega T} \right| \quad (8)$$

To summarize this, we have:

$$|G_2|=|\alpha \cos \omega T+(1-\alpha)| \quad (9)$$

(where $\omega$ is the spatial angular frequency, and T is the sampling interval)

[Characteristics of Overall Unit]

The frequency gain characteristics $|G|$ of the overall R and G units are expressed by a product of $|G_1|$ and $|G_2|$, and are given by:

$$\begin{aligned} |G| &= |G_1| \cdot |G_2| \quad (10) \\ &= \sqrt{(1-2\beta)^2+4\beta(1-\beta)\cos^2\frac{\omega T}{2}} \times \\ & \quad |(1-\alpha)+\alpha\cos\omega T| \end{aligned}$$

On the other hand, it can be easily led that B gain characteristics are expressed as follows in consideration of the fact that the B sensor has a sub-scan opening area twice those of the remaining two sensors:

In equi-magnification (100%) reading, $$G_3 = \frac{1+Z^{-1}}{2}$$

In 200% reading, $$G_3 = \frac{1+Z^{-2}}{2}$$

In 300% reading, $$G_3 = \frac{1+Z^{-3}}{2}$$

Therefore, by replacing $Z^{-1}$ with $e^{-j\omega T}$, frequency gain characteristics at corresponding magnification factors are calculated as:

In equi-magnification (100%) reading, $$|G_3| = \left| \cos \frac{\omega T}{2} \right|$$

In 200% reading, $$|G_3| = |\cos \omega T|$$

In 300% reading, $$|G_4| = \left| \cos \frac{3}{2} \omega T \right|$$

Therefore, at other magnification factors, the frequency gain characteristics can be estimated to be:
In m% reading, $$|G_3| = \left| \cos \frac{m}{200} \omega T \right| \quad (11)$$

Therefore, as the frequency gain characteristics of the overall unit, R is expressed by:

$$|G_R| = \sqrt{(1-2\beta_R)^2 + 4\beta_R(1-\beta_R)\cos^2 \frac{\omega T}{2}} \times |(1-\alpha_R) + \alpha_R \cos \omega T| \quad (12)$$

$$|G_G| = \sqrt{(1-2\beta_G)^2 + 4\beta_G(1-\beta_G)\cos^2 \frac{\omega T}{2}} \times |(1-\alpha_G) + \alpha_G \cos \omega T| \quad (13)$$

$$|G_B| = \left| \cos \left( \frac{m}{200} \omega T \right) \right| \quad (14)$$

A condition for matching frequency characteristics of the three signals is:

$$|G_R| = |G_G| = |G_B| \quad (15)$$

On the other hand, $\beta_R$ and $\beta_G$ are uniquely determined by equations (4) and (5) according to a magnification factor. A spatial angular frequency to be most noticed is determined, and is substituted in $\omega$, so that $\alpha_R$ and $\alpha_G$ can be uniquely determined by equations (12), (13), (14), and (15).

More specifically, from equations (12), (13), (14), and (15), $$\alpha_R = \left( \frac{\sqrt{(1-2\beta_R)^2 + 4\beta_R(1-\beta_R)\cos^2 \frac{\omega T}{2}}}{\left| \cos \left( \frac{m}{200} \omega T \right) \right|} - 1 \right) /(1-\cos \omega T) \quad (16)$$

$$\beta_R = \left( \frac{\sqrt{(1-2\beta_G)^2 + 4\beta_G(1-\beta_G)\cos^2 \frac{\omega T}{2}} - 1}{\left| \cos \left( \frac{m}{200} \omega T \right) \right|} \right) /(1-\cos \omega T) \quad (17)$$

Since the sampling interval T is variable in inverse-proportion to a variable magnification factor, when the spatial angular frequency $\omega$ to be noticed is assumed to be constant, approximation to some extent can be made to have:

$$\omega T = \frac{100}{m} \times \frac{\pi}{2} \quad (18)$$

Figure 27:
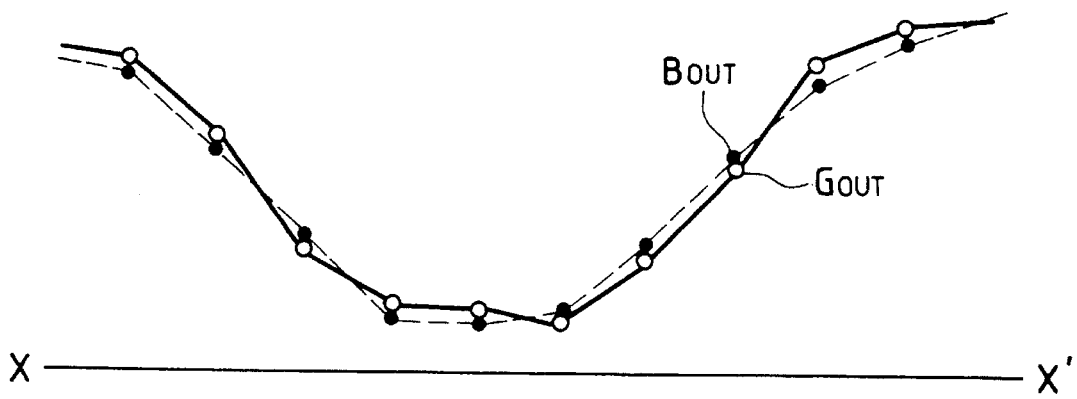

FIG. 27 shows the result of the above-mentioned processing, i.e., interpolation and smoothing. For example, a color difference occurs between $B_0$ and $G_0$ in FIG. 26, while it is improved in FIG. 27.

In this embodiment, signals having different spatial frequency gain characteristics in the sub scan direction with respect to an original have been exemplified. However, the present invention is not limited to the sub scan direction, but may be applicable to signals having different characteristics in the main scan direction.

[Overall Processing Flow]

Figure 30:
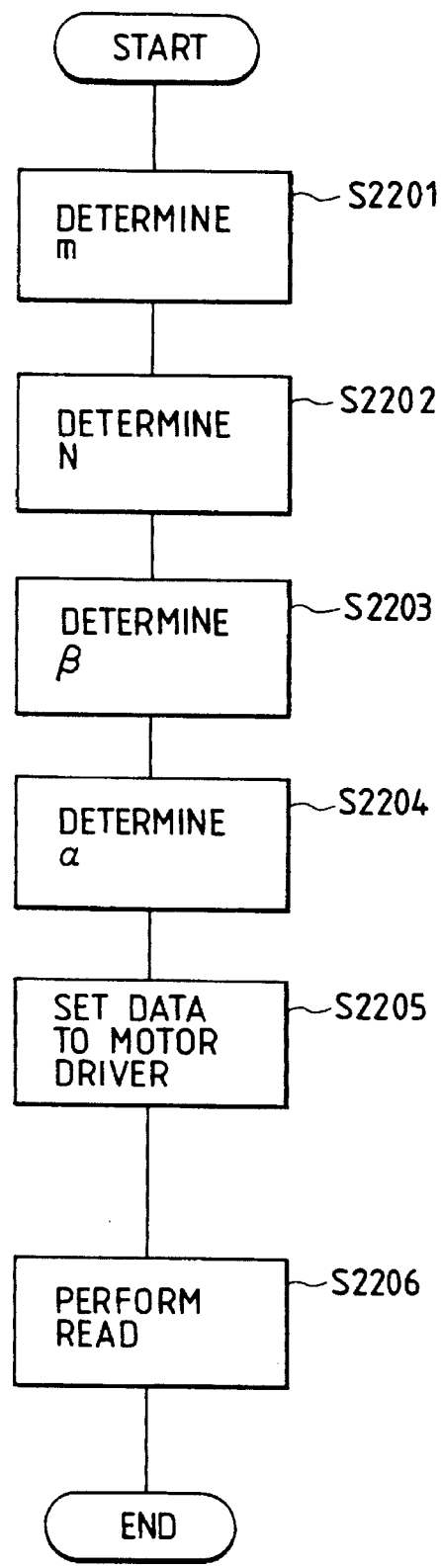
FIG. 30 is a flow chart showing the overall processing according to the third embodiment of the present invention.

FIG. 30 shows the overall processing flow of this embodiment. This flow is executed by the CPU 2113.

In step S2201, a magnification factor m is input and determined by the operation unit.

In step S2202, line delay amounts $N_R$ and $N_G$ are determined by equations (2) and (3).

In step S2203, interpolation coefficients $\beta_R$ and $\beta_G$ are determined by equations (4) and (5).

In step S2204, smoothing coefficients $\alpha_R$ and $\alpha_G$ are determined by equations (16), (17), and (18).

In step S2205, data is set in the motor driver 2120 according to equation (1), so that a desired speed can be obtained. The coefficients in steps S2202 to S2205 are uniquely determined by the magnification factor m, and are read out from the ROM table 2150.

Finally, the read operation is performed in step S2206.

As described above, according to this embodiment, an image input apparatus comprises an image signal generation means for generating a plurality of preprocessing image signals based on different spectral sensitivity characteristics. Further provided are means for performing interpolation calculation processing and smoothing processing of at least one preprocessing signal other than a specific preprocessing signal having lowest spatial frequency gain characteristics in a specific direction of these plurality of preprocessing signals. In this apparatus, a post-processing signal and the specific preprocessing signal have the almost equal spatial frequency gain characteristics in the specific direction.

In this embodiment, the line sensors are arranged in the order of R, G, and B, and the R and G signals other than the B signal as an image signal having lowest spatial frequency gain characteristics are smoothed. However, the arrangement of the line sensors is not limited to this.

The present invention is not always limited to the above-mentioned line sensors, but may be applicable to mosaic line sensors for sequentially reading R, G, and B images, area sensors, and the like to prevent color misregistration.

Fourth Embodiment

The third embodiment relates to a full-color reading unit. This embodiment relates to a two-color, i.e., red/black reading unit.

Figure 31:
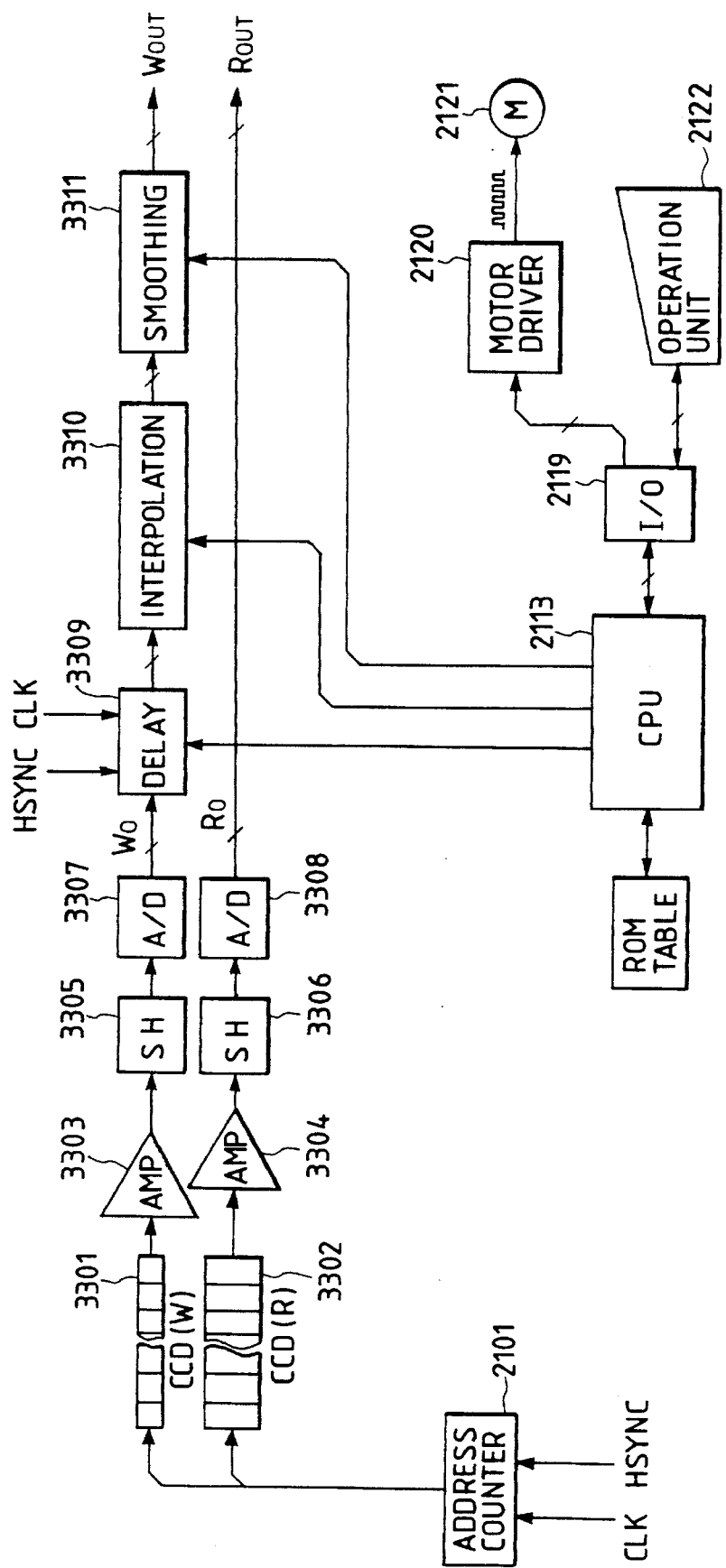
FIG. 31 is a block diagram showing signal processing according to the fourth embodiment of the present invention.
Figure 32:
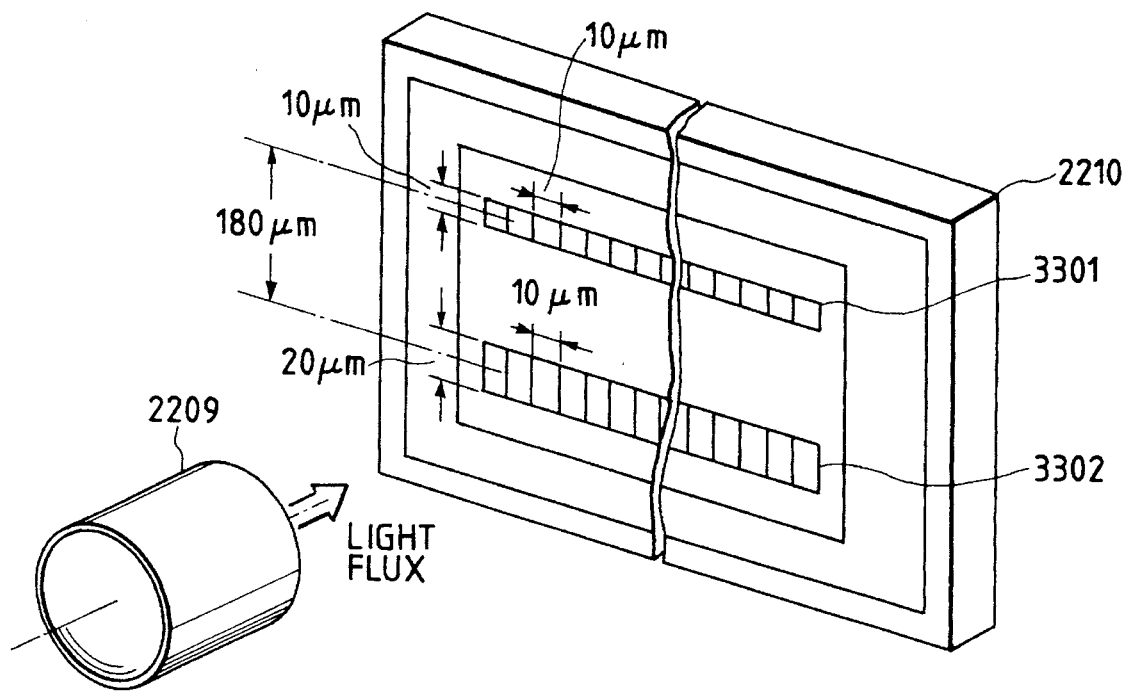
FIG. 32 is a perspective view showing a line sensor according to the fourth embodiment of the present invention.

FIGS. 31 and 32 show the fourth embodiment of the present invention. FIG. 32 shows the image sensor of this embodiment. A white component (W) line sensor 3301 has a sensitivity for all visible light components. A red component (R) sensor 3302 is covered with a red filter, and has a sensitivity for only a red light component. Since the red sensor 3302 has a lower light amount sensitivity per unit area than that of the white sensor 3301 due to the presence of the filter, the red sensor 3302 has a larger width than that of the white sensor 3301 to compensate for a difference in the sensitivity. That is, the sensor 3302 has a size of 10 μm×20 μm, and the sensor 3301 has a size of 10 μm×10 μm.

FIG. 31 shows a processing circuit for these sensors.

The same reference numerals in FIG. 31 denote the same parts as in FIG. 16.

Image signals read by the CCD (W) 3301 and the CCD (R) 3302 are output through amplifiers 3303 and 3304, sample & hold circuits 3305 and 3306, and A/D converters 3307 and 3308, and are synchronized with each other by a delay circuit 3309. Upon comparison between outputs $W_0$ and $R_0$, the spatial frequency gain characteristics of $W_0$ are higher than those of $R_0$.

Therefore, like in the third embodiment, the characteristics of these outputs are matched with each other by an interpolation circuit 3310 and a smoothing circuit 3311, thus obtaining outputs $W_{out}$ and $R_{out}$.

Fifth Embodiment

Interpolation and smoothing are not limited to those in the sub scan direction. FIGS. 33 to 37 show the fifth embodiment of the present invention.

Figure 34:
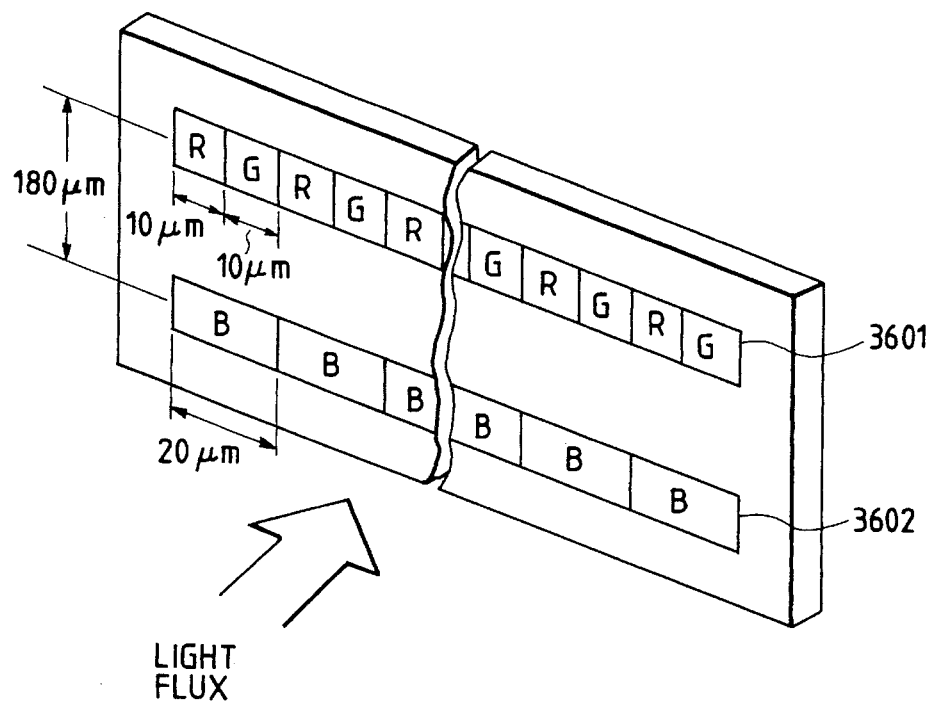
FIG. 34 is a perspective view showing a sensor according to the fifth embodiment of the present invention.

FIG. 34 shows the sensor used in this embodiment. More specifically, the sensor comprises a CCD (R/G) 3601 which is constituted by a 10 μm×10 μm pixel array and in which red (R) and green (G) component filters are respectively deposited on every other pixel, and a CCD (B) 3602 constituted by a 20 μm×10 μm pixel array.

Figure 33:
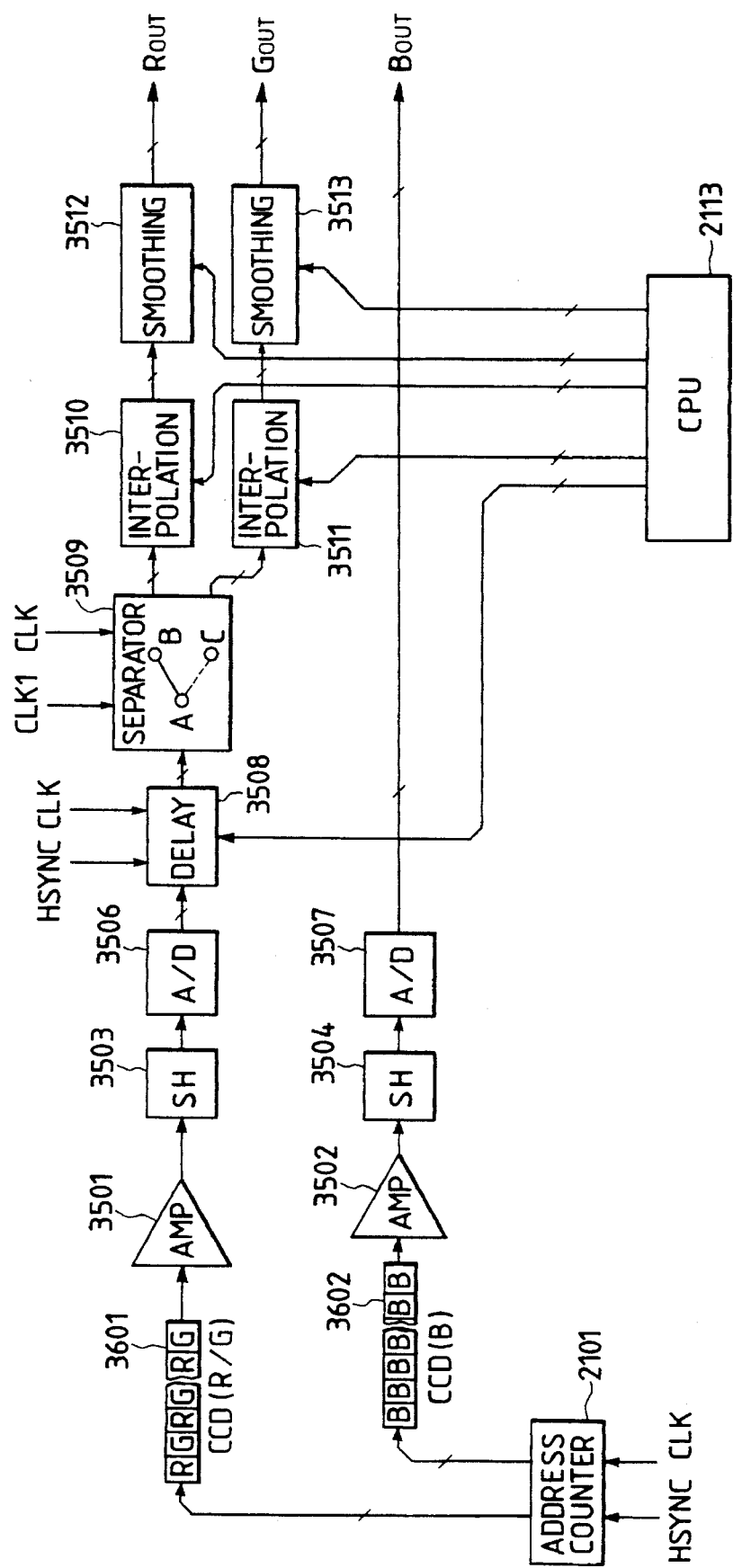
FIG. 33 is a block diagram showing signal processing according to the fifth embodiment of the present invention.

FIG. 33 shows a circuit arrangement of the image processing apparatus of the fifth embodiment.

As image signals read by the CCD 3601, read signals of R and G pixels are alternately output, and are sent to a separator 3509 via an amplifier 3501, a sample & hold circuit 3503, and an A/D converter 3508. The separator 3509 receives an image clock CLK and a clock CLK1 having a period twice that of the clock CLK at timings shown in FIG. 37.

The separator 3509 alternately distributes the input signals, and outputs the distributed signals to B and C outputs, thus separating R and G.

Furthermore, in FIG. 33, the R and G signals separated by the separator 3509 are then output through interpolation circuits 3510 (FIG. 35A) and 3511 (FIG. 35B) for matching phases in the main scan direction, and smoothing circuits 3512 and 3513 (FIG. 33) for matching spatial frequency sensitivity characteristics.

Figure 35A:
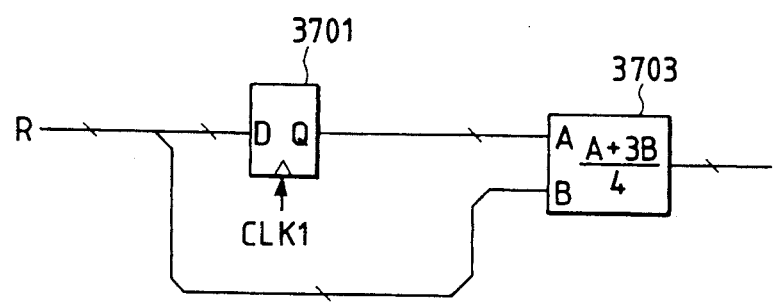
FIGS. 35A and 35B are diagrams showing interpolation circuits according to the fifth embodiment of the present invention.
Figure 35B:
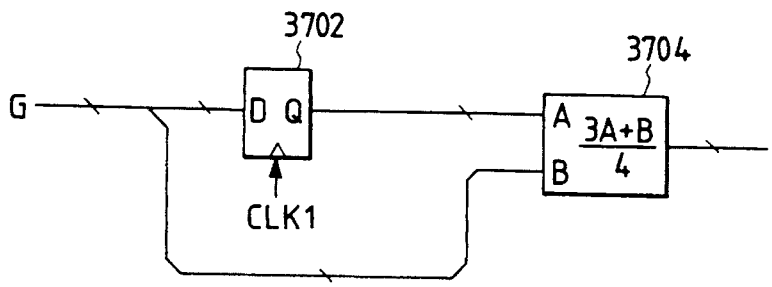

The circuits shown in FIGS. 35A and 35B comprise pixel delay flip-flops 3701 and 3702, and tables 3703 and 3704, comprising, e.g., a RAM or ROM for calculating (A+3B)/4 using inputs A and B, respectively.

Figure 36:
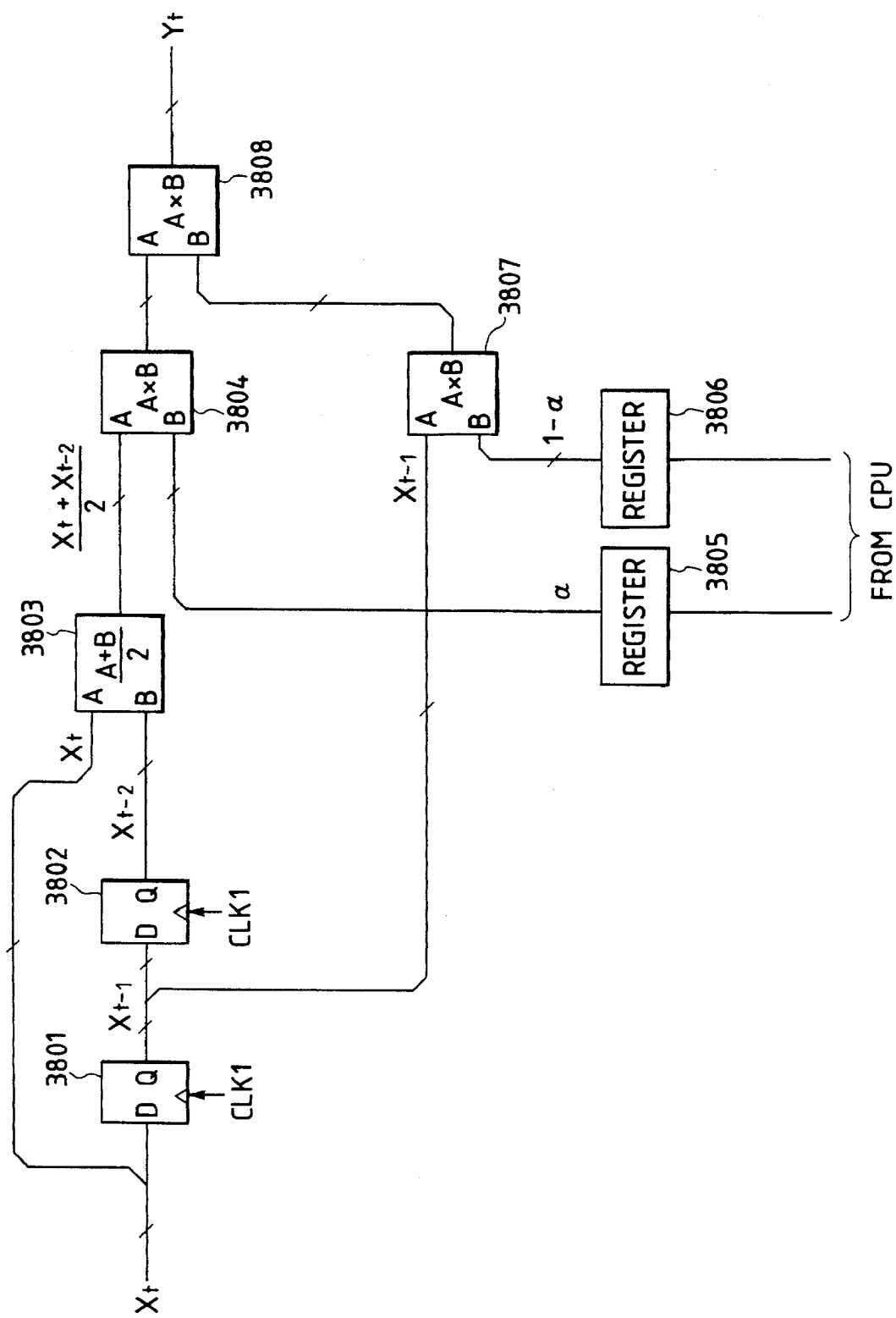
FIG. 36 is a circuit diagram showing a smoothing circuit according to the fifth embodiment of the present invention.
Figure 37:
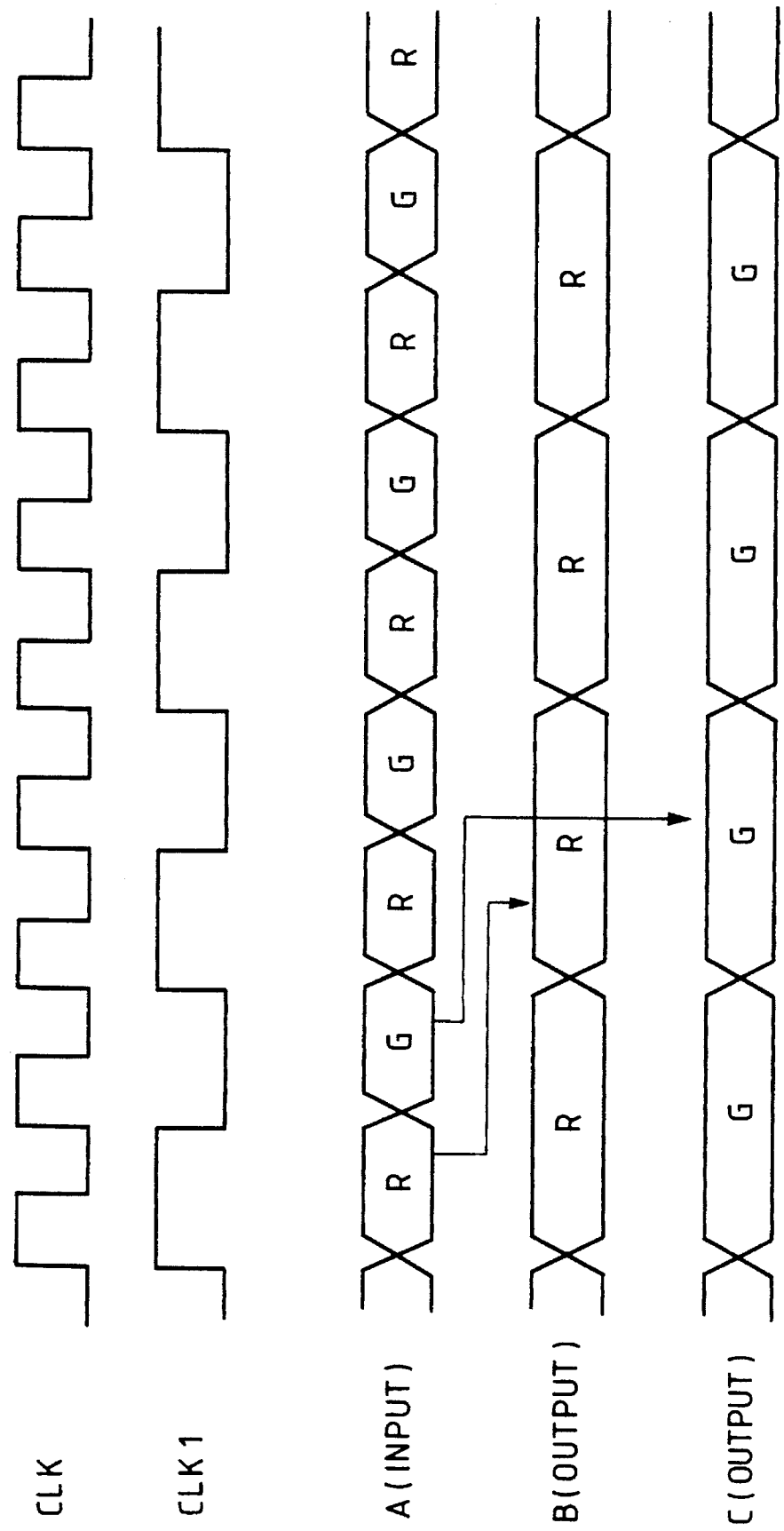
FIG. 37 is a timing chart according to the fifth embodiment of the present invention.

FIG. 36 shows the arrangement of each of the smoothing circuits 3512 and 3513 shown in FIG. 33. Each smoothing circuit comprises pixel delay flip-flops 3801 and 3802, calculation tables 3803, 3804, 3807, and 3808, and registers 3805 and 3806.

Note that thinning and interpolation methods and their coefficients are not limited to those described above. For example, thinning and interpolation may be performed using data of several lines before and after a line of interest.

The present invention is not limited to a line sensor. For example, the present invention is applicable to an area sensor and image signals sent from an external circuit via communications.

The present invention can be applied to various image processing apparatuses such as a color laser printer, a color thermal transfer printer, a color ink-jet printer, and the like.

In particular, according to the present invention, since spatial frequency characteristics of color component signals are taken into consideration and color component signals free from color misregistration can be obtained, the present invention is suitable for a color laser copying machine which has a photosensitive body and forms a full-color image by overlaying a plurality of color toners on a recording member, and a color ink-jet printer for forming a full-color image by overlaying a plurality of color ink droplets on a recording member.

The R, G, and B signals generated in each of the third to fifth embodiments described above are input to the black area judgment circuit 806 shown in, e.g., FIG. 1, so that a chromatic/achromatic level in units of pixels can be judged. Single black color printing processing and black-and-white/color judgment of an original can be performed using the judgment result.

The number of surrounding pixels used for smoothing is not limited to that in the above embodiments.

The number of pixels generated by interpolation is not limited to that in the above embodiments.

The color component signals are not limited to R, G, and B signals but may be Y (yellow), M (magenta), and C (cyan) signals or (X, Y, Z) signals.

As described above, according to the embodiments of the present invention, interpolation calculations and smoothing calculations can be performed for only a signal having relatively high spatial frequency sensitivity characteristics in a specific direction, thus preventing color misregistration caused by interpolation and smoothing.

According to the present invention, color misregistration can be prevented, and good image processing can be performed.

The present invention is not limited to the above embodiment, and various changes and modifications may be made within the scope of the appended claims.

What is claimed is:

1. An image processing apparatus comprising:
   a) input means for inputting a first color component signal and a second color component signal both representing an input image;
   b) first correcting means for correcting a spatial frequency characteristic of the first color component signal and the second color component signal so as to match spatial frequency characteristics of the first color component signal and the second color component signal;
   c) judging means for judging a color of the input image based on the first color component signal and the second color component signal having matched spatial frequency characteristics; and
   d) second correcting means for correcting a judgment result of said judging means, said second correcting means correcting a judgment result of an object pixel of the input image by using plural pixels adjacent the object pixel.

2. An apparatus according to claim 1, wherein said input means generates a plurality of image signals based on different spectral characteristics.

3. An apparatus according to claim 2, wherein said input means comprises a plurality of parallel CCD line sensors.

4. An apparatus according to claim 1, wherein said first correcting means includes smoothing means for smoothing at least one of the first color component signal and the second color component signal.

5. An apparatus according to claim 1, wherein said judging means judges a chromatic/achromatic level of a pixel of interest.

6. An apparatus according to claim 1, wherein said judging means comprises detecting means for detecting maximum and minimum values of a plurality of color component signals.

7. An apparatus according to claim 1, wherein said second correcting means includes an OR circuit.

8. An apparatus according to claim 1, further comprising output means for outputting a plurality of reproduction signals to a printer in accordance with a judgment result corrected by said second correcting means.

9. An image processing method comprising:
   a) an input step for inputting a first color component signal and a second color component signal both representing an input image;
   b) a first correcting step for correcting a spatial frequency characteristic of the first color component signal and the second color component signal so as to match spatial frequency characteristics of the first color component signal and the second color component signal;
   c) a judging step for judging a color of the input image based on the first color component signal and the second color component signal having corrected spatial frequency characteristics; and
   d) a second correcting step for correcting a judgment result of said judging step, wherein in said second correcting step, a judgment result of an object pixel of the input image is corrected by using plural pixels adjacent the object pixel.

* * * * *

UNITED STATES PATENT AND TRADEMARK OFFICE
CERTIFICATE OF CORRECTION

PATENT NO. : 5,555,107

DATED : September 10, 1996

INVENTORS : Masahiro Funada, et al.

It is certified that error appears in the above-identified patent and that said Letters Patent is hereby corrected as shown below:

COLUMN 9:

Line 21, "means" should be --judgment means--.

Signed and Sealed this

Eighteenth Day of March, 1997

Attest:

BRUCE LEHMAN

Attesting Officer

Commissioner of Patents and Trademarks